US006977117B2

(12) United States Patent
Ariyasu et al.

(10) Patent No.: US 6,977,117 B2
(45) Date of Patent: Dec. 20, 2005

(54) THERMOPLASTIC RESIN INTEGRATED STRUCTURE

(75) Inventors: Hideyuki Ariyasu, Fujisawa (JP); Hironori Tsuji, Fuchu (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 181 days.

(21) Appl. No.: 09/773,627

(22) Filed: Feb. 2, 2001

(65) Prior Publication Data

US 2001/0034407 A1 Oct. 25, 2001

(30) Foreign Application Priority Data

Feb. 2, 2000 (JP) ....................................... 2000-025401
Apr. 21, 2000 (JP) ....................................... 2000-120550
Aug. 25, 2000 (JP) ....................................... 2000-255571

(51) Int. Cl.[7] .......................... B32B 27/08; B32B 27/42

(52) U.S. Cl. .................... 428/477.4; 428/501; 428/524; 428/525

(58) Field of Search ............................. 428/501, 477.4, 428/524, 525, 473; 525/156, 160, 161, 162, 163, 164, 165, 159, 158, 157

(56) References Cited

U.S. PATENT DOCUMENTS

| | | | | | |
|---|---|---|---|---|---|
| 3,754,053 | A | * | 8/1973 | Kray et al. | 525/398 |
| 4,017,558 | A | * | 4/1977 | Schmidt et al. | 525/91 |
| 4,250,661 | A | * | 2/1981 | Kodera et al. | 47/58.1 R |
| 4,377,667 | A | * | 3/1983 | Sakurai et al. | 525/400 |
| 4,535,127 | A | * | 8/1985 | Matsuzaki et al. | 525/154 |
| 5,108,844 | A | * | 4/1992 | Blemberg et al. | 428/518 |

FOREIGN PATENT DOCUMENTS

| | | | | |
|---|---|---|---|---|
| DE | 100 61 767 | A1 | | 9/2001 |
| EP | 522180 | A1 | * | 1/1993 |
| GB | 1145074 | | * | 3/1969 |
| JP | 58-053953 | A | * | 3/1983 |
| JP | 3162914 | | | 7/1991 |
| JP | 6200117 | | | 7/1994 |
| JP | 994922 | | | 4/1997 |
| JP | 9248851 | | | 9/1997 |
| JP | 9278983 | | | 10/1997 |
| JP | 10-29276 | A | * | 2/1998 |
| JP | 10-029276 | A | * | 2/1998 |
| JP | 1112321 | | | 1/1999 |
| JP | 11320605 | | | 11/1999 |
| JP | 11320606 | | | 11/1999 |
| JP | 20000086736 | A | * | 3/2000 |

* cited by examiner

*Primary Examiner*—Kevin R. Kruer
(74) *Attorney, Agent, or Firm*—Birch, Stewart, Kolasch & Birch, LLP

(57) ABSTRACT

A thermoplastic resin integrated structure, which comprises a structural member (A) molded from a resin composition (a) comprising 5–80 wt. % of polyacetal resin (a-1) and 20–95 wt. % of at least one resin (a-2) selected from the group consisting of polyolefin resin, olefinic elastomer and hydrogenated butadienic elastomer, and a structural member (B) molded from thermoplastic resin (b), the integrated structure having at least one structure of the structural member (A) and the structural member (B) as integrated together side by side has a good bonding strength between the structural member (A) molded from polyacetal-based resin and the structural member (B) molded from other thermoplastic resin, typically polyethylene.

21 Claims, 6 Drawing Sheets

THERMOPLASTIC RESIN INTEGRATED STRUCTURE

BACKGROUND OF THE INVENTION

The present invention relates to an integrated structure of polyacetal resin molding and thermoplastic resin molding as integrated together and also to automobile parts, electric and electronic equipment parts, OA-related parts, various parts of industrial sundries, etc., composed of the integrated structure.

Polyacetal resin has distinguished mechanical strength, creep characteristics, lubricating characteristics and electrical characteristics and thus is widely used, for example, in automobile parts, electric and electronic equipment parts, OA-related parts, various parts of industrial sundries, etc. Particularly due to such advantages as superior resistance of polyacetal resin to fuel, polyacetal resin is much used in bracket-materials for in-tank type fuel pump systems, fuel tank flanges, or automobile fuel tank-related parts such as valves, etc., which are disclosed in JP-A-8-279373.

Nowadays, total-amount control over hydrocarbon emission from automobiles (so called Vehicle Evaporative Emission Regulation) is under study from the viewpoint of environmental friendliness. For example, in case of mounting a polyacetal resin valve onto a fuel tank of blow molded multilayer resins of various materials, whose outermost layer is composed of polyethylene resin so as to prevent fuel leakage when the automobile is turned over, it is proposed to fix the valves to the sealing parts through rubber O-rings by screwing. However, a problem of fuel evaporation along the O-rings is not overcome in the proposed procedure, so that the amount of hydrocarbon emission from the automobile cannot be fully controlled.

Integrated structures of polyacetal resin and a different material as integrated together have been so far keenly desired. One of procedures to meet such a desire is to weld a polyacetal resin valve to the polyethylene outermost layer of resin fuel tank, but the polyacetal resin, which is highly crystalline, fails to fulfill sufficient welding at the boundary between the different materials and thus easily peels away under an external force, failing to satisfy the function required for the integrated structures in practice.

To improve the weldability between polyacetal resin and different materials, it has been so far proposed to provide configurations with a mechanical anchor effect such as undercuts, perforations, etc., but provision of proposed configurations complicates shapes and process steps, leading to economical disadvantages and undesirable production efficiency.

Recently, many attempts have been proposed to weld or integrate polyacetal resin with other thermoplastic resins.

For example, JP-A-9-248851 discloses blow molded multilayer articles with an adhesive resin layer of modified olefinic polymer sandwiched between a polyacetal resin layer and another thermoplastic resin layer so as to enhance the bonding strength between both layers, but the bonding strength between the polyacetal resin layer and the modified olefinic polymer layer is practically not satisfactory.

JP-A-2000-8981 discloses a method for integrating a polyethylene resin piece with a polyacetal resin piece using an annular welding part of modified polyolefin resin having polar functional groups, but the welding strength between the annular welding part and the polyacetal resin piece is also considerably low and fails to fulfill practical services.

Furthermore, JP-A-11-320605 discloses a composite molding made by the so called resin insert injection molding, i.e. by providing a polyacetal resin injection molding in a molding, treating the surface skin layer of the molding by flame, etc., and then injection molding another thermoplastic resin thereon, but the bonding strength between the polyacetal resin and the other thermoplastic resin is also still not satisfactory, and furthermore the step of heat treating the surface of polyacetal resin molding with flame, hot air, etc. is complicated and economically efficient.

JP-A-11-320606 discloses a composite molding made by the so called resin insert injection molding, i.e. by providing a polyacetal resin injection molding into a mold and then injection molding polyalkylene terephthalate resin thereon, but conditions for injection molding the polyalkylene terephthalate resin as a secondary member have a low degree of freedom, e.g. unless a plasticizing cylinder temperature, a filling time, etc. are carefully selected, there would be a high possibility to fail to obtain a composite molding with a satisfactory bonding strength, and a complicated problem in setting the molding conditions and a laborious problem in quality control at mass production in molding shops, etc. at the same time.

SUMMARY OF THE INVENTION

An object of the present invention is to provide an integrated structure of polyacetal resin and different materials as integrated together and also to provide resin products such as automobile parts, etc. composed of the integrated structure.

As a result of extensive studies to attain the object of the present invention, the present inventors have found that the object can be attained by an integrated structure comprising a structural member molded from a resin composition comprising a mixture of polyacetal resin with at least one resin selected from the group consisting of polyolefin resin, olefinic elastomer and hydrogenated butadienic elastomer, and a structural member molded from thermoplastic resin, and have established the present invention.

That is, the present invention relates to an integrated thermoplastic resin structure, which comprises a structural member (A) molded from a resin composition (a) comprising 5–80% by weight of polyacetal resin (a-1) and 20–95% by weight of at least one resin (a-2) selected from the group consisting of polyolefin resin, olefinic elastomer and hydrogenated butadienic elastomer, and a structural member (B) molded from thermoplastic resin (b), the integrated structure including at least one structure of the structural member (A) and the structural member (B) as integrated together side by side.

Furthermore, the present invention relates to an integrated thermoplastic resin structure, which further comprises a structural member (C) molded from polyacetal resin (c), in addition to the structural members (A) and (B), the integrated structure including at least one structure of structural member (C)-structural member (A)-structural member (B) as integrated together in this order.

Still furthermore, the present invention relates to a resin product composed of the above-mentioned integrated resin structure such as automobile parts, etc.

DETAILED DESCRIPTION OF THE INVENTION

Figure 1:
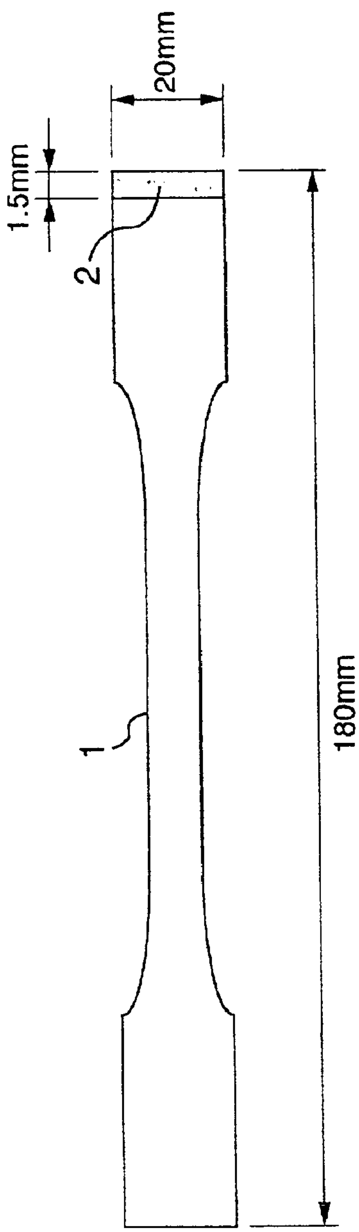
FIG. 1 is a front view of an ASTM No. 1 dumbbell.

The present invention will be described in detail below.

In the present invention, a structural member (A) is molded from a resin composition (a) comprising 5–80% by weight of polyacetal resin (a-1) and 20–95% by weight of at least one resin (a-2) selected from the group consisting of polyolefin resin, olefinic elastomer and hydrogenated butadienic elastomer.

Polyacetal resin (a-1) includes, for example, polyacetal homopolymers prepared by polymerizing formaldehyde or its cyclic oligomer such as a trimer (i.e. trioxane), a tetramer (i.e. tetraoxane) or the like, followed by blocking the terminals of the resulting polymer with ether groups and/or ester groups, and polyacetal copolymers containing not less than 80 mol. % of oxymethylene units originating from formaldehyde or its cyclic oligomer such as a trimer (i.e. trioxane), a tetramer (i.e. tetraoxane), etc., for example, copolymers of formaldehyde or its cyclic oligomer such as a trimer (i.e. trioxane), a tetramer (i.e. tetraoxane), etc. with ethylene oxide, propylene oxide, 1,3-dioxolane or a cyclic ether such as glycol formal, diglycol formal, etc. and block copolymer of said polyacetal homopolymers and/or said copolymers with polymers having hydroxyl groups, carboxyl groups, amino groups, ester groups, or alkoxy groups.

Above all, polyacetal copolymers are preferable. Particularly preferable are polyacetal copolymers whose molecular terminals contain hydroxyalkyl groups at a hydroxyalkyl group terminal concentration of not less than $5\times10^{-5}$ moles per mole of oxymethylene units. More preferable are polyacetal copolymers whose hydroxyalkyl group terminal concentration is not less than $10\times10^{-5}$ moles per mole of oxymethylene units. Further preferable are those whose hydroxyalkyl group terminal concentration is not less than $30\times10^{-5}$ moles per mole of oxymethylene units.

"Hydroxyalkyl group terminal concentration" herein referred to is a value in terms of moles per mole of oxymethylene units, determined by reacting polyacetal copolymer with acetic anhydride at a temperature not higher than the melting point of the polyacetal copolymer, thereby acetylating the terminal hydroxyalkyl groups, and measuring number of acetylated terminals by ultraviolet absorption spectrum.

Various procedures are available to adjust the hydroxyalkyl group terminal concentration of polyacetal copolymer. For example, water, alcohols, preferably aliphatic alcohols having not more than 10 carbon atoms, such as methanol, ethanol, etc., acids such as formic acid, etc. or the like may be used as a chain transfer agent during the polymerization reaction, or polymers containing hydroxyl groups may be used as a chain transfer agent. If required, formal such as methylal may be used at the same time.

Preferable polyacetal copolymers include polyacetal block copolymers obtained by copolymerizing cyclic acetal with cyclic ether and/or cyclic formal, using a hydroxyl group-containing polymer having a molecular weight of 500–10,000 as a chain transfer agent. Such a chain transfer agent includes polyethylene, hydrogenated polybutadiene, hydrogenated polyisoprene, etc. with hydroxyl group(s) at one or both ends.

Furthermore, other preferable polyacetal copolymers include polyacetal block copolymers having a number average molecular weight of 10,000–500,000, which comprises polyacetal segments (X) and a hydrogenated polybutadiene segment (Y) having a number average molecular weight of 500–10,000 hydroxyalkylated at both ends, represented by the following formula (1):

(1)

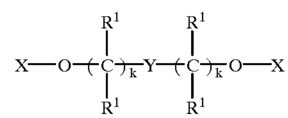

[where X comprises 95–99.9 mol. % of oxymethylene units and 0.1–5 mol. % of oxyalkylene units represented by the following formula (2):

(2)

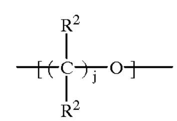

(where $R^2$ is independently selected from the group consisting of hydrogen, an alkyl group, a substituted alkyl group, an aryl group and a substituted aryl group and j is an integer selected from 2 to 6), and the terminal groups are polyacetal copolymer residues having a structure represented by the following formula (3):

(3)

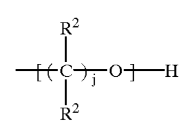

(where $R^2$ and j have the same meanings as defined above), Y is a hydrogenated polybutadiene containing 70–98 mol. % of 1,2 bonds and 2–30 mol. % of 1.4 bonds and having an iodine value of not more than 20 g-$I_2$/100 g, $R^1$ is independently selected from the group consisting of hydrogen, an alkyl group, a substituted alkyl group, an aryl group and a substituted aryl group and k is an integer selected from 2 to 6, where two ks may be the same or different from each other].

Polymerization catalyst for polyacetal copolymers is preferably a cationic active catalyst such as Lewis acids, protonic acids and their esters or anhydrides, or the like. Lewis acids include, for example, halides of boron, tin, titanium, phosphorus, arsenic and antimony, typically boron trifluoride, tin tetrachloride, titanium tetrachloride, phosphorus pentafluoride, phosphorus pentachloride, antimony pentafluoride, and their complex compounds and salts. Protonic acids, and their esters or anhydrides include, for example, perchloric acid, trifluoromethanesulfonic acid, t-butyl perchlorate, acetyl perchlorate, trimethyloxonium hexafluorophosphate, etc., among which boron trifluoride, boron trifluoride hydrate, and coordination complex compounds of oxygen atom or sulfur atom-containing organic compounds with boron trifluoride are preferable, and preferable examples thereof typically include diethyl ether of boron trifluoride and di-n-butyl ether of boron trifluoride. The polymerization catalyst is used in an amount of preferably $1\times10^{-6}$ mole–$1\times10^{-3}$ mole, more preferably $5\times10^{-6}$ mole–$1\times10^{-4}$ mole on the basis of total one mole of trioxane and cyclic ether and/or cyclic formal when the oxymethylene units originate from trioxane.

Polymerization process is not particularly limited, so far as it is a process for polymerizing the so far well known polyacetal copolymer, for example, a bulk polymerization process, which may be carried out batchwise or continuously. By the bulk polymerization a solid massive polymer can be usually obtained in progress of polymerization, using monomers in a molten state.

Deactivation of the polymerization catalyst remaining in the resulting polyacetal copolymers is carried out by adding the polyacetal copolymers obtained by the aforementioned polymerization reaction to an aqueous solution or organic solvent solution containing at least one of catalyst neutralizers/deactivators such as ammonia, amines (e.g. triethylamine, tri-n-butylamine, etc.), hydroxides, inorganic acid salts, organic acid salts, etc. of alkali metals or alkaline earth metals, followed by stirring in a slurry state usually for a few minutes to a few hours. After the catalyst neutralization/deactivation, the slurry is filtered and washed to remove unreacted monomers and the catalyst neutralizer/deactivator, and dried.

A process for deactivating the polymerization catalyst by contact of the polyacetal copolymer with vapors of ammonia, triethylamine, etc., or a process for deactivating the polymerization catalyst by contact of the polyacetal copolymer with at least one of hindered amines, triphenylphosphine, calcium hydroxide, etc. in a mixer can be also used.

Description will be made below of terminal stabilization treatment of polyacetal copolymer following the polymerization catalyst deactivation. A process for removing unstable terminals by decomposition comprises, for example, melting polyacetal copolymer in the presence of a basic compound capable of decomposing the unstable terminals such as ammonia, aliphatic amines (e.g. triethylamine, tributylamine, etc.) and hydroxides, inorganic weak acid salts and organic weak acid salts of alkali metals or alkaline earth metals (e.g. calcium hydroxide) or the like in a vented uniaxial screw extruder or a vented biaxial screw extruder or the like, thereby removing the unstable terminals. Above all, a process for treating thermally unstable terminals, using at least one of quaternary ammonium compounds represented by the following formula (4) is preferable. Polyacetal copolymers stabilized by these specific quaternary ammonium compounds contain substantially no remaining unstable terminals.

$$[R^3R^4R^5R^6N^-]_nZ^{n-} \quad (4)$$

(where $R^3$, $R^4$, $R^5$ and $R^6$ independently represent a non-substituted or substituted alkyl group having 1 to 30 carbon atoms, an aryl group having 6–20 carbon atoms, an aralkyl group whose non-substituted or substituted alkyl group having 1 to 30 carbon atoms is substituted by at least one aryl group having 6 to 20 carbon atoms and an alkylaryl group substituted by a non-substituted or substituted alkyl group having 1 to 30 carbon atoms; the non-substituted or substituted alkyl group may be straight, branched or cyclic; the hydrogen atom of the non-substituted alkyl group, the aryl group, the aralkyl group and the alkylaryl group may be substituted by halogen; n represents an integer of 1–3; and Z represents a hydroxyl group or an acid residue of carboxylic acids having 1 to 20 carbon atoms, hydroacids, oxo-acids, inorganic thio acids or organic thio acids having 1 to 20 carbon atoms).

Compounds of the aforementioned quaternary ammonium salts include, for example, hydroxides, hydroacid salts other than halides (e.g. hydrogen azide, etc.), and salts of oxo-acids (e.g. sulfuric acid, nitric acid, phosphoric acid, carbonic acid, boric acid, chloric acid, iodic acid, silicic acid, perchloric acid, chlorous acid, hypochlorous acid, chlorosulfuric acid, amidosulfuric acid, disulfuric acid, tripolyphosphoric acid, etc.), salts of thio acids (e.g. thiosulfuric acid, etc.), salts of carboxylic acids (e.g. formic acid, acetic acid, propionic acid, butanoic acid, isobutyric acid, pentanoic acid, caproic acid, capric acid, caprylic acid, benzoic acid, oxalic acid, etc.) of tetramethylammonium, tetraethylammonium, tetrapropylaammonium, tetra-n-butylaammonium, cetyltrimethylammonium, tetradecyltrimethylammonium, 1,6-hexamethylene-bis-(trimethylammonium), decamethylene-bis-(trimethylammonium), trimethyl-3-chloro-2-hydroxypropylammonium, trimethyl(2-hydroxyethyl)-ammonium, triethyl(2-hydroxyethyl)ammonium, tripropyl (2-hydroxy)ammonium, tri-n-butyl(2-hydroxyethyl) ammonium, trimethylbenzylammonium, triethylbenzylammonium, tripropylbenzylammonium, tri-n-butylbenzylammonium, trimethylphenylammonium, triethylphenylammonium, trimethyl-2-oxyethylammonium, monomethyltrihydroxyethylammonium, monoethyltrihydroxyethylammonium, octadecyl-tri(2-hydroxyethyl)ammonium, tetrakis(hydroxyethyl) ammonium, etc. Above all, ammonium salts of hydroxide ($OH^-$), sulfates($HSO_4^-$, $SO_4^{2-}$), carbonates($HCO_3^-$, $CO_3^{2-}$), borate($B(OH)_{4-}$), and carboxylates are preferable. Particularly preferable are ammonium salts of formate, acetate and propionate.

These quaternary ammonium compounds can be used alone or in combination of at least two thereof. An amount of the quaternary ammonium compound to be used is 0.05–50 ppm by weight in terms of quaternary ammonium compound-derived nitrogen amount represented by the following formula (5) on the basis of the polyacetal copolymer:

$$P\times14/Q \quad (5)$$

(where P is a concentration (ppm by weight) of quaternary ammonium compound in the polyacetal copolymer, "14" is the atomic weight of nitrogen and Q is the molecular weight of quaternary ammonium compound).

The polyacetal resin (a-1) can be composed of one of the aforementioned polyacetal copolymers alone or a mixture of at least two thereof, or a mixture thereof with, for example, at least one of polyacetal polymers whose hydroxyalkyl group terminal concentration is not more than $5\times10^{-5}$ mole per mole of oxymethylene units.

Polyacetal polymers for use in the aforementioned mixture include, for example, polyacetal homopolymers prepared by polymerizing formaldehyde or its cyclic oligomers such as a trimer (e.g. trioxane) or a tetramer (tetraoxane), or the like, followed by blocking the terminals of the resulting polymers by ether and/or ester groups; polyacetal copolymers prepared by copolymerizing formaldehyde or its trimer (e.g. trioxane) or its tetramer (e.g. tetraoxane) with a cyclic ether (e.g. ethylene oxide, propylene oxide, 1,3-dioxolane, 1,4-butanediolformal, etc.) or the polymers with cross-linked or branched molecular chains; and polyacetal block copolymers comprising segments of oxymethylene units and segments of different component, polymer terminals being blocked by ether and/or ester bonds.

Preferable polyacetal polymers are polyacetal homopolymers and polyacetal copolymers prepared by copolymerization with ethylene oxide or 1,3-dioxolane. More preferable are polyacetal copolymers prepared by copolymerization with ethylene oxide or 1,3-dioxolane.

Melting point of polyacetal copolymers for use as polyacetal polymers is not particularly limited, but is selected in view of melting point of polyacetal resin (a-1) as will be described later, and is preferably 140°–173° C. "Melting point" herein referred to is a value determined by a differential scanning calorimeter (Model DSC7, made by Perkin-Elmer Corp.). Polyacetal copolymer sample for use in determination is prepared by cutting out 5 mg from polyacetal copolymer film molded by a press heated at 200° C. Melting point determination is carried out by heating a sample from 30° up to 200° C. at a rate of 320° C./min., followed by retaining at 200° C. for 2 minutes, cooling down to 130° C. at a rate of 10° C./10 min. and heating from 130° C. at a rate of 2.5° C./min. to observe an endothermic peak due to crystallization during this last heating, where the observed peak top temperature is made a melting point.

Melt index (which will be hereinafter referred to as "MFR") of polyacetal polymers is not particularly restricted, but is selected in view of MFR of polyacetal resin (a-1) as will be described later, and is preferably 0.1–200 g/10 min. MFR herein referred to is a value determined according to ASTM-D1238 at 190° C. under a load of 2,160 g.

Detailed description will be made below of terminal groups of copolymer chains contained in the polyacetal copolymers preferably for use as polyacetal resin (a-1) in the present invention.

In the present invention, the terminal groups contained in one or more polyacetal copolymer chains as a whole, which constitute a polyacetal copolymer, include an alkoxyl group [e.g. methoxyl group (—$OCH_3$), etc.], hydroxyalkyl group [e.g. hydroxyethyl group (—$CH_2CH_2OH$), etc.], and a formate group.

Terminal alkoxyl group having at least one carbon atom is formed by formal added as a molecular weight-adjusting agent at the polymerization stage. For example, when methylal [$(CH_3O)_2CH_2$] is usually used as a molecular weight-adjusting agent, a methoxyl group is formed as a terminal group. Number of carbon atoms of terminal alkoxyl group is not particularly limited, but is usually 1–10, preferably 1–3, from the viewpoints of synthesis and purification of formal as a molecular weight-adjusting agent.

Terminal hydroxyalkyl group such as hydroxyethyl group or hydroxybutyl group is formed as a hydroxymethyl group (—$CH_2OH$) at first when water or alcohol (e.g. methanol) or acid (e.g. formic acid) is used as a molecular weight-adjusting agent at the polymerization stage or when a compound having a hydroxyl group at the terminal or the like is used for chain transfer. When the resulting polyacetal copolymer with hydroxymethyl groups at the terminals is subjected to a posttreatment, e.g. heat treatment in the presence of an aqueous alkaline compound solution such as an aqueous triethylamine solution, unstable portions containing the hydroxymethyl groups are decomposed. The decomposition proceeds inwardly through the main chain containing oxymethylene units and oxyalkylene units. When the decomposition arrives at the site of oxyalkylene unit, the oxyalkylene unit at that site is converted to a stable terminal structure such as hydroxyethyl group or hydroxybutyl group. Number of carbon atoms of hydroxyalkyl group is not particularly limited, but is preferably at least 2, particularly 2–10, from the viewpoint of synthesis and purification of cyclic ether and cyclic formal.

In the present invention, complete decomposition of unstable portions containing hydroxymethyl methyl groups having one carbon atom and replacement of all the hydroxymethyl groups with hydroxyalkyl groups having at least two carbon atoms, as described above, are a most preferable mode, though, even polyacetal copolymers, containing more or less remaining hydroxymethyl groups can be used without any objection in the present invention. The remaining hydroxymethyl groups can be quantitatively determined by way of an amount of formaldehyde gas evolved from polyacetal copolymer used as polyacetal resin (a-1), e.g. by thermally promoting decomposition of unreacted unstable portions in the aforementioned decomposition reaction, measuring an amount of formaldehyde evolved by the decomposition, and using the measurement as a substitute for an amount of the remaining hydroxymethyl groups. Specifically, polyacetal copolymer is placed in an aluminum vessel, melted in a nitrogen atmosphere by heating at 230° C. for 50 minutes, while absorbing evolved formaldehyde gas into an aqueous sodium sulfite solution, followed by titration with sulfuric acid of appropriate normality as a titrant to determine an amount of evolved formaldehyde gas from the amount of the titrant used. In the present invention, an amount of evolved formaldehyde gas is preferably not more than 2,500 ppm, more preferably not more than 1,500 ppm. It is important to add a necessary amount of an antioxidant or a heat stabilizer, as will be described later, to the polyacetal copolymer to be used as a sample before the determination. In case of an antioxidant alone it is preferable to add not less than 0.3 parts by weight of an antioxidant to 100 parts by weight of polyacetal copolymer, though dependent on species of antioxidant.

Melting point of the present polyacetal resin (a-1) is not particularly limited, but is selected in view of service conditions of automobile parts, and is preferably 140°–173° C. MFR of polyacetal resin (a-1) is also not particularly limited, but is selected in view of the service conditions as in case of the melting point, and is preferably 0.1–200 g/10 min, more preferably 0.1–120 g/10 min.

Polyolefin resin for use as the present resin (a-2) includes, for example, homopolymers and copolymers of olefinic unsaturated compounds represented by the following formula (6), modified products thereof and mixture of at least two thereof.

$$H_2C{=}CR^7R^8 \qquad (6)$$

(where $R^7$ represents a hydrogen atom or a methyl group and $R^8$ represents a hydrogen atom, an alkyl group having 1–10 carbon atoms, a carboxyl group, an alkylcarboxyl group having 2–5 carbon atoms, an acyloxy group having 2–5 carbon atoms or a vinyl group), and includes, for example, polyethylene (e.g. high density polyethylene, intermediate density polyethylene, high pressure processed low density polyethylene, linear low density polyethylene and ultralow density polyethylene), polypropylene, ethylene-propylene copolymer, ethylene-butene copolymer, polypropylene-butene copolymer, polybutene, ethylene-acrylate ester copolymer, ethylene-methacrylate ester copolymer, ethylene-acrylic acid copolymer, ethylene-vinyl acetate copolymer and its saponified product, etc. Modified products include, for example, graft copolymers obtained by grafting of at least one of other vinyl compounds and modified products obtained by modification with compounds having an acid anhydride group, a glycidyl group or the like.

Above all, preferable are homopolymers of polyethylene (e.g. high density polyethylene, intermediate polyethylene, high pressure processed low density polyethylene, linear low density polyethylene and ultralow density polyethylene), block copolymers containing ethylene as the main component (e.g. polyethylene copolymer, ethylene-propylene copolymer, ethylene-butene copolymer, etc.), and ionomers.

Molecular weights of these polyolefin resins are not particularly limited, but their weight average molecular weights are in a range of preferably 10,000–1,000,000, more preferably 10,000–500,000, most preferably 10,000–300,000.

Copolymer of ethylene and glycidyl methacrylate, copolymers further with such monomers as vinyl acetate, methyl acrylate, etc., or block copolymers of these monomers can be also preferably used.

Preferable polyolefin elastomers for use as resin (a-2) include modified α-olefinic polymers. Modified α-olefinic polymers are graft copolymers prepared by grafting 100 parts by weight of α-olefinic polymers as a base material with 0.01–10 parts by weight of unsaturated carboxylic acid or its acid anhydride, and the unsaturated carboxylic acid or its acid anhydride as a graft monomer component includes acrylic acid, methacrylic acid, α-ethylacrylic acid, maleic acid, fumaric acid, itaconic acid, citraconic acid, tetrahydrophthalic acid, end-cis-bicyclo[2,2,1]-hept-5-en-2,3-dicarboxylic acid (nadic acid), methyl-endo-cis-bicyclo[2,2,1]hept-5-en-2,3-dicarboxylic acid (methylnadic acid), etc., and anhydrides of these unsaturated carboxylic acids (i.e. maleic anhydride, citraconic anhydride, itaconic anhydride, tetrahydrophthalic anhydride, nadic anhydride, methylnadic anhydride, etc.), among which unsaturated dicarboxylic acids, and anhydrides thereof are preferable, and maleic acid and maleic anhydride are particularly preferable.

α-Olefin component, which constitutes the modified α-olefinic polymer, includes ethylene, propylene, butene-1, pentene-1, 4-methylpentene-1, hexene-1, heptene-1, octene-1, nonene-1, decene-1, undecene-1, dodecene-1, tridecene-1, tetradecene-1, pentadecene-1, hexadecene-1, heptadecene-1, octadecene-1, nonadecence-1, icosene-1, and aliphatic substituted vinyl monomers such as isobutylene, etc. α-olefinic polymers are composed of at least one of these monomers. Furthermore, aromatic vinyl monomers such as styrene, substituted styrene, etc.; esteric vinyl monomers such as vinyl acetate, acrylate ester, methacrylate ester, glycidylacrylate ester, glycidylmethacrylate ester, hydroxyethylmethacrylate ester, etc.; nitrogen-containing vinyl monomers such as acrylamide, allylamine, vinyl-p-amino-benzene, acrylonitrile, etc.; dienes such as butadiene, cyclopentadiene, 1,4-hexadiene, isoprene, etc. may be contained as a constituent.

Furthermore, the a -olefinic polymers are preferably those prepared by using a single site catalyst. Single site catalyst is a catalyst with uniform active site properties such as metallocene catalyst containing 1–3 molecules of cyclopentadienyl or substituted cyclopentadienyl, as disclosed in JP-A-4-12283, JP-A-60-35006, JP-A-60-35007, JP-A-60-35008, JP-A-63-280703, JP-A-5-155930, JP-A-3-163088 and U.S. Pat. No. 5,272,236, geometrically controlled catalyst, etc.

Preferable cyclopentadienyl or substituted cyclopentadienyl content is 1–2 molecules. Titanium, zirconium, silicon and hafnium are preferably used as a metal component.

Metallocene catalyst includes, for example, zirconium compounds such as cyclopentadienylzirconium trichloride, pentamethylcyclopetadienylzirconium trichloride, bis(cyclopentadienyl)zirconium dichloride, bis(cyclopentadienyl)zirconium monomethyl monochloride, bis(methylcyclopentadienyl)zirconium dichloride, bis(pentamethylcyclopentadienyl)zirconium dichloride, bis(ethylcyclopentadienyl)zirconium dichloride, bis(cyclopentadienyl)zirconium dialkyl, bis(cyclopentadienyl)zirconium diphenyl, dimethylsilyldicyclopentadienylzirconium dimethyl, methylphosphinedicyclopentadienylzirconium dimethyl, etc.; titanium compounds such as bis(indenyl)titanium diphenyl, bis(cyclopentadienyl)titanium dialkyl, bis(cyclopentadienyl)titanium diphenyl, bis(methylcyclopentadienyl)titanium dialkyl, bis(1,2-dimethylcyclopentadienyl)titanium diphenyl, bis(1,2-dimethylcyclopentadienyl)titanium dichloride, etc.; hafnium compounds such as bis(cyclopentadienyl)-hafnium dichloride, bis(cyclopentadienyl)hafnium dimethyl, etc.; vanadium compounds such as bis(cyclopentadienyl) vanadium chloride, etc., and so on.

Geometrically controlled catalyst includes, for example, (t-butylamido)-(tetramethyl-η5-cyclopentadienyl)-1,2-ethanediylzirconium dichloride, (t-butylamido)-(tetramethyl-η5-cyclopentadienyl)-1,2-ethanediyltitanium dichloride, (methylimido)-(tetramethyl-η5-cyclopentadienyl)-1,2-ethanediylzirconium dichloride, (methylamido)-(tetramethyl-η5-cyclopentadienyl)-1,2-ethanediyltitanium dichloride, (ethylamido)-(tetramethyl-η5-cyclopentadienyl)-methylenetitanium dichloride, (t-butylamido)dimethyl-(tetramethyl-η5-cyclopentadienyl) silanetitanium dichloride, (t-butylamido)dimethyl (tetramethyl-η5-cyclopentadienyl)-silanezirconium dibenzyl, (benzylamido)dimethyl-(tetramethyl-η5-cyclopentadienyl)silanetitanium dichloride, (phenylphosphido)dimethyl-(tetramethyl-η5-cyclopentadienyl)silanezirconium dibenzyl, etc.

It is preferable to use the single site catalyst together with a promoter. Promoter as disclosed in the aforementioned publications can be used as a promoter. Preferable promoter is at least one member selected from organoaluminum oxy compounds with such alkyloxyaluminum units as methylaluminoxane, ethylaluminoxane, etc. as repeat units, organoaluminum compounds such as alkylaluminum, trialkylaluminum, etc., $[Bu_3NH][B(C_6H_4R)_4]$, $C_2B_9H_{13}$, water, Lewis acids, aluminum salts, etc.

Among α-olefinic polymers prepared by using the aforementioned single site catalyst, copolymers of ethylene and α-olefin having 3–20 carbon atoms are particularly preferable. Furthermore, copolymers of propylene and α-olefin having 3–20 carbon atoms can be also used preferably as an α-olefinic polymers.

Furthermore, hydrogenated polybutadiene elastomers can be also used preferably as resin (a-2).

It is more preferable to use at least two of polyolefin resin, olefinic elastomer and hydrogenated polybutadiene elastomer as aforementioned resin (a-2), and particularly preferable resin (a-2) is a composition comprising at least one resin selected from polyethylene homopolymers, polyethylene copolymers, block copolymers containing ethylene as the main component and ionomers, and at least one resin selected from modified α-olefinic polymers.

A mixing proportion of polyacetal resin (a-1) to resin (a-2) in the present resin composition (a) is 5–80% by weight of polyacetal resin (a-1) and 20–95% by weight of resin (a-2) on the basis of total weight of resin composition (a). When the proportion of resin (a-2) is less than 20% by weight, the bonding strength between the structural member (B) molded from thermoplastic resin (b) and the structural member (A) will be unpreferably lowered, whereas when the proportion of resin (a-2) exceeds 95% by weight, physical properties proper to the polyacetal copolymer as polyacetal resin (a-1) such as fuel antipermeability, etc. will be unpreferably and considerably deteriorated. Mixing proportion is preferably 10–80% by weight of polyacetal resin (a-1) and 20–90% by weight of resin (a-2), more preferably 15–80% by weight of polyacetal resin (a-1) and 20–85% by weight of resin (a-2), further more preferably 15–60% by weight of polyacetal resin (a-1) and 40–85% by weight of resin (a-2), most preferably 20–60% by weight of polyacetal resin (a-1) and 40–80% by weight of resin (a-2). Practically, for example, in case of use as automobile parts, etc., it is preferable to select a mixing proportion in view of service conditions of the parts, such as circumstances, etc.

Additives to the present resin composition (a) include those so far used for the conventional polyacetal resin, polyolefin resin, olefinic elastomer and hydrogenated butadienic elastomer, such as a heat stabilizer, an antioxidant, a weather (light) resistant stabilizer, a mold-releasing agent, a lubricant, a crystal nucleating agent and an antistatic agent, at least one of which can be added thereto, if required, in a desired amount. Furthermore, inorganic fillers such as glass fibers, talc, wollastonite, hydrotalcite, etc.; carbon black; pigment, etc. can be also added thereto, if required, in a desired amount.

Heat stabilizer includes (a) hydroxides inorganic acid salts, carboxylates or alkoxides of alkali metal or alkaline earth metals, (b) formaldehyde reactive nitrogen-containing compounds and (c) formaldehyde reactive nitrogen-containing polymers, and so on.

Hydroxides, inorganic acid salts, carboxilates or alkoxides of alkali metals or alkaline earth metals of the foregoing item (a) include, for example, hydroxides of sodium, potassium, magnesium, calcium or barium, and carbonates, phosphates, silicates, berates, carboxylates, etc. of the aforementioned metals.

Carboxylic acids in the carboxylates are saturated or unsaturated aliphatic carboxylic acids having 10–36 carbon atoms, which may be substituted by a hydroxyl group. Saturated aliphatic carboxylic acids include capric acid, lauric acid, myristic acid, palmitic acid, stearic acid, arachidic acid, behenic acid, ligoceric acid, cerotic acid, montanic acid, melissic acid, ceroplastic acid, etc. Unsaturated aliphatic carboxylic acids include undecylenic acid, oleic acid, elaidic acid, cetoleic acid, erucic acid, brassidic acid, sorbic acid, linoleic acid, linolenic acid, arachidonic acid, propiolic acid, stearolic acid, etc.

Alkoxides include include methoxides, ethoxides, etc. of alkali metals or alkaline earth metals.

Above all, difatty acid calciums comprising at least one of fatty acids having 10–36 carbon atoms are preferably used, where palmitic acid, heptadecylic acid and stearic acid are preferable. Preferably, 0.01–2 parts by weight of difatty acid calcium is added to 100 parts by weight of resin composition (a).

Formaldehyde reactive nitrogen-containing compounds of the aforementioned item (b) include (1) dicyandiamide, (2) amino-substituted triazine and (3) copolycondensates of amino-substituted triazine and formaldehyde, etc.

Amino-substituted triazine of the aforementioned item (2) includes, for example, guanamine (2,4-diamino-sym-triazine), melamine (2,4,6-triamino-sym-triazine), N-butylmelamine, N-phenylmelamine, N,N-diphenylmelamine, N,N-diallylmelamine, N,N',N"-triphenylmelamine, N-methylolmelamine, N,N'-dimethylolmelamine, N,N',N"-trimethylolmelamine, benzoguanamine (2,4-diamino-6-phenyl-sym-triazine), 2,4-diamino-6-methyl-sym-triazine, 2,4-diamino-6-butyl-sym-triazine, 2,4-diamino-6-benzyloxy-sym-triazine, 2,4-diamino-6-butoxy-sym-triazine, 2,4-diamino-6-cyclohexyl-sym-triazine, 2,4-diamino-6-chloro-sym-triazine, 2,4-diamino-6-mercapto-sym-triazine, 2,4-dioxy-6-amino-sym-triazine, 2-oxy-4,6-diamino-sym-triazine, N,N',N"-tetracyanoethylbenzoguanamine, etc.

Copolycondensates of amino-substituted triazine and formaldehyde of the aforementioned item (3) includes, for example, polycondensate of melamine-formaldehyde, etc.

Above all, dicyandiamide, melamine and polycondensate of melamine-formaldehyde are preferable.

Formaldehyde reactive nitrogen-containing polymers of the aforementioned item (c) include (1) polyamide resin, (2) polymers obtained by polymerization of acrylamide or its derivatives, or acrylamide or its derivative and other vinyl monomers in the presence of a metal alcoholate, (3) polymers obtained by polymerization of acrylamide or its derivatives, or acrylamide or its derivative any other vinyl monomers in the presence of a radical polymerization catalyst, and (4) polymers having nitrogen groups such as amine, amide, urea, urethane, etc.

Polyamide resin of the aforementioned item (1) includes nylon 4-6, nylon 6, nylon 6-6, nylon 6-10, nylon 6-12, nylon 12, etc. and their copolymer resins such as nylon 6/6-6, nylon 6/6-6/6-10, nylon 6/6-12, etc.

Polymers obtained by polymerization of acrylamide or its derivative, or acrylamide or its derivative and other vinyl monomers in the presence of a metal alcoholate of the aforementioned item (2) include poly-β-alamine copolymer. These polymers can be prepared by processes disclosed in JP-B-6-12259, JP-B-5-87096, JP-B-5-47568 and JP-A-3-234729.

Polymers obtained by polymerization of acrylamide or its derivatives, or acrylamide or its derivatives and other vinyl monomers in the presence of a radical polymerization catalyst of the aforementioned item (3) can be prepared by a process disclosed in JP-A-3-28260.

Antioxidant is preferably a hindered phenol-based antioxidants, which includes, for example, n-octadecyl-3-(3',5'-di-t-butyl-4'-hydroxyphenyl) propionate, n-octadecyl-3-(3'-methyl-5'-t-butyl-4'-hydroxyphenyl) propionate, n-tetradecyl-3-(3',5'-di-t-butyl-4'-hydroxyphenyl) propionate, 1,6-hexanediol-bis-(3-(3,5-di-t-butyl-4-hydroxyphenyl)-propionate), 1,4-butanediol-bis-(3-(3,5-di-t-butyl-4-hydroxyphenyl)-propionate), triethyleneglycol-bis-(3-(3-t-butyl-5-methyl-4-hydroxyphenyl)-propionate), tetrakis-(methylene-3-(3',5'-di-t-butyl-4'-hydroxyphenyl) propionate methane, 3,9-bis-(2-(3-(3-t-butyl-4-hydroxy-5-methylphenyl)propionyloxy)-1,1-dimethylethyl) 2,4,8,10-tetraoxaspiro(5,5)undecane, N,N'-bis-3-(3',5'-di-t-butyl-4-hydroxyphenol)propionylhexamethylene-diamine, N,N'-tetramethylene-bis-3-(3'-methyl-5'-t-butyl-4-hydroxyphenol)propionyldiamine, N,N'-bis-(3-(3,5-di-t-butyl-4-hydroxyphenol)propionyl)hydrazine, N-salicyloyl-N'-salicylidenehydrazine, 3-(N-salicyloyl)amino-1,2,4-triazole, N,N'-bis(2-(3-(3,5-di-butyl-4-hydroxyphenyl) propionyloxy)ethyl)oxyamide, etc.

Among these hindered phenol-based antioxidants, triethyleneglycol-bis-(3-(3-t-butyl-5-methyl-4-hydroxyphenyl)propionate), tetrakis-(methylene-3-(3',5'-di-t-butyl-4'-hydroxyphenyl)-propionate methane are preferable. Particularly preferable is triethyleneglycol-bis-(3-(3-t-butyl-5-methyl-4-hydroxyphenyl)-propionate).

Weather (light)-resistant agent preferably include (a) benzotriazole-based compounds, (b) oxalic anilide-based compounds and (c) hindered amine-based compounds.

Benzotriazole-based compounds of the aforementioned item (a) includes, for example, 2-(2'-hydroxy-5'-methyl-phenyl) benzotriazole, 2-(2'-hydroxy-3,5-di-t-butyl-phenyl) benzotriazole, 2-(2'-hydroxy-3,5-di-isoamyl-phenyl) benzotriazole, 2-(2'-hydroxy-3,5-bis-(α,α-dimethylbenzyl) phenyl-2H-benzotriazole, 2-(2'-hydroxy-4'-octoxyphenyl) benzotriazole, etc. Preferable are 2-(2'-hydroxy-3,5-bis-(α,α-dimethylbenzyl)phenyl)-2H-benzotriazole and 2-(2'-hydroxy-3,5-di-t-butylphenyl) benzotriazole.

Oxalic anilide-based compounds of the aforementioned item (b) include, for example, 2-ethoxy-2'-ethyloxalic acid bisanilide, 2-ethoxy-5-t-butyl-2'-ethyloxalic acid bisanilide, 2-ethoxy-3'-dodecyloxalic acid bisanilide, etc.

Hindered amine-based compounds of the aforementioned item (c), include, for example, 4-acetoxy-2,2,6,6-tetramethylpiperidine, 4-stearoyloxy-2,2,6,6-tetramethylpiperidine, 4-acryloyloxy-2,2,6,6-tetramethylpiperidine, 4-(phenylacetoxy)-2,2,6,6-tetramethylpiperdine, 4-benzoyloxy-2,2,6,6-tetramethylpiperidine, 4-methoxy-2,2,6,6-tetramethylpiperidine, 4-stearyloxy-2,2,6,6-tetramethylpiperidine, 4-cyclohexyloxy-2,2,6,6-tetramethylpiperidine, 4-benzyloxy-2,2,6,6-tetramethylpiperidine, 4-phenoxy-2,2,6,6-tetramethylpiperidine, 4-(ethylcarbamoyloxy)-2,2,6,6-tetramethylpiperadine, 4-(cyclohexylcarbomoyloxy)-2,2,6,6-tetramethylpiperidine, 4-(phenylcarbamoyloxy)-2,2,6,6-tetramethylpiperidine, bis-(2,2,6,6-tetramethyl-4-piperidyl) carbonate, bis-(2,2,6,6-tetramethyl-4-piperidyl) oxalate, bis-(2,2,6,6-tetramethyl-4-piperidyl) malonate, bis-(2,2,6,6-tetramethyl-4-piperidyl) sebacate, bis-(2,2,6,6-tetramethyl-4-piperidyl) adipate, bis-(2,2,6,6-tetramethyl-4-piperidyl) terephthalate, 1,2-bis-(2,2,6,6-tetramethyl-4-piperidyloxy) ethane, α,α'-bis-(2,2,6,6-tetramethyl-4-piperidyloxy)-p-xylene, bis-(2,2,6,6-tetramethyl-4-piperidyl) tolylene-2,4-dicarbamate, bis-(2,2,6,6-tetramethyl-4-piperidyl)-hexamethylene-1,6-dicarbamate, tris-(2,2,6,6-tetramethyl-4-piperidyl)-benzene-1,3,5-tricarboxylate, tris-(2,2,6,6-tetramethyl-4-piperidyl)-benzene-1,3,4-tricarboxylate, etc. Preferable is bis-(2,2,6,6-tetramethyl-4-piperidyl) sebacate.

These hindered amine-based compounds can be used above or in combination of at least two thereof.

The aforementioned benzotriazole-based compound or a combination of the aforementioned oxalic anilide-based compound and hindered amine-based compound is most preferable.

Lubricant includes (a) silicone compounds or their modified compounds, (b) alcohols, fatty acids or esters of alcohols and fatty acid, (c) esters of alcohols and dicarboxylic acids, (d) polyoxyalkylene glycol compounds and (e) olefinic compounds having an average degree of polymerization of 10–500.

Silicone compounds or their modified compounds of the aforementioned item (a) include dimethylpolysiloxane and silicone compounds derived by substituting the methyl group of dimethylpolysiloxane with hydrogen, an alkyl group, an aryl group, an ether group, an ester group or a reactive substituent group such as an amino group, an epoxy group, a carboxyl group, a carbinol group, a methacryl group, a mercapto group, a phenol group, a vinyl group, a polyether group, a fluorine-containing alkyl group, etc., or further include, for example, silicone compound-grafted polyethylene, polypropylene, polymethylpentene, polystyrene, copolymers thereof, ethylene-vinyl acetate copolymer, etc.

In alcohols, fatty acids and esters of alcohols and fatty acids of the aforementioned item (b), alcohols include monohydric alcohols and polyhydric alcohols. Monohydric alcohols include, for example, octyl alcohol, capryl alcohol, nonyl alcohol, decyl alcohol, undecyl alcohol, lauryl alcohol, tridecyl alcohol, myristyl alcohol, pentadecyl alcohol, cetyl alcohol, heptadecyl alcohol, stearyl alcohol, oleyl alcohol, nonadecyl alcohol, eicosyl alcohol, behenyl alcohol, ceryl alcohol, melissyl alcohol, 2-hexadecanol, 2-octyldodecanol, 2-decyltetradecanol and 2-decylstearyl alcohol.

Polyhydric alcohols include, for example, polyhydric alcohols having 2–6 carbon atoms such as ethylene glycol, diethylene glycol, triethylene glycol, propylene glycol, dipropylene glycol, butanediol, pentanediol, hexanediol, glycerin, diglycerin, triglycerin, pentaerythritol, arabitol, ribitol, xylitol, sorbite, sorbitan, sorbitol, mannitol, etc.

Fatty acids include caproic acid, enanthic acid, caprylic acid, pelargonic acid, capric acid, undecylic acid, lauric acid, tridecylic acid, myristic acid, pentadecylic acid, palmitic acid, stearic acid, nonadecanoic acid, arachic acid, behenic acid, lignoceric acid, cerotic acid, heptacosanoic acid, montanic acid, melissic acid, lacceric acid, undecylenic acid, oleic acid, elaidic acid, cetoleic acid, erucic acid, brassidic acid, sorbic acid, linoleic acid, linolenic acid, arachidonic acid, propiolic acid, stearolic acid, etc. or further natural fatty acids containing such compounds or their mixtures. These fatty acids may be substituted by a hydroxyl group.

Esters of alcohols and fatty acids include esters of the aforementioned monohydric and polyhydric alcohols or such alcohols as methyl alcohol, ethyl alcohol, propyl alcohol, butyl alcohol, amyl alcohol, hexyl alcohol, heptyl alcohol, etc. and the aforementioned fatty acids.

Esters of alcohols and dicarboxylic acids of the aforementioned item (c) include monoesters and diesters of saturated or unsaturated monohydric alcohols (e.g. octyl alcohol, nonyl alcohol, decyl alcohol, undecyl alcohol, lauryl alcohol, tridecyl alcohol, myristyl alcohol, pentadecyl alcohol, cetyl alcohol, heptadecyl alcohol, stearyl alcohol, oleyl alcohol, nonodecyl alcohol, eicosyl alcohol, ceryl alcohol, behenyl alcohol, melissyl alcohol, hexyldecyl alcohol, octyldodecyl alcohol, decylmyristyl alcohol, decylstearyl alcohol, etc.) and dicarboxylic acids (e.g. oxalic acid, malonic acid, succinic acid, glutaric acid, adipic acid, pimelic acid, suberic acid, azelaic acid, sebacic acid, undecanoic acid, brassilic acid, maleic acid, fumaric acid, glutaconic acid, etc.), and their mixtures.

Polyoxyalkylene glycol compounds of the aforementioned item (d) include 3 groups of compounds.

First group includes polycondensates based on alkylene glycols as monomers, such as polyethylene glycol, polypropylene glycol, block polymers of ethylene glycol and propylene glycol, etc.

Second group includes ether compounds of the first group and an aliphatic alcohol, such as polyethylene glycol oleyl ether, polyethylene glycol cetyl ether, polyethylene glycol stearyl ether, polyethylene glycol lauryl ether, polyethylene glycol tridecyl ether, polyethylene glycol nonylphenyl ether, etc.

Third group include ester compounds of first group and a higher fatty acid such as polyethylene glycol monolaurate, polyethylene glycol monostearate, polyethylene glycol monooleate, etc.

These additives to resin composition (a) may be added to polyacetal resin (a-1) or resin (a-2).

In the present invention, resin composition (a) can be prepared by kneading polyacetal resin (a-1) and resin (a-2), for example, through a so far well known extruder-kneader, etc., or by physically mixing polyacetal resin (a-1) with resin (a-2), for example, through a so far well known molding machine such as an injection molding machine, a blow molding machine, an extruder molding machine, a press molding machine, etc. in molding of structural member (A), where a master batch with elevated concentrations of the individual components can be also used. Resin composition (a) may be mixed with other thermoplastic resin within such a range as not to deteriorate the effects of the present invention.

Thermoplastic resin (b) for use in the present structural member (B) is not particularly limited, and includes, for example, polypropylene, polyethylene, polyacetal, polyamide, modified polyphenylene ether, polybutylene terephthalate, polyethylene terephthalate, polystyrene, ABS, AS, polycarbonate, polymethyl methacrylate, etc.; copolymers containing at least one of these polymers as the main component; and so far well known polymer alloys of polycarbonate-ABS, polycarbonate-polybutylene terephthalate, etc.

Above all, polyolefin resin (typically polypropylene and polyethylene) and modified α-olefinic polymers are preferable. Furthermore, polyamide resin (typically nylon 6, nylon 6-6, etc.) can be preferably used.

For automobile fuel tank-related resin parts, homopolymer of polyethylene (e.g. high density polyethylene, intermediate density polyethylene, high pressure processed low density polyethylene, linear low density polyethylene and ultralow density polyethylene), block copolymers containing ethylene as the main component (e.g. polyethylene copolymer, ethylene-propylene copolymer, ethylene-butene copolymer, etc.), and iomers are particularly preferable.

Polyacetal resin (c) for use in the present structural member (C) is so far well known polyacetal-based resins, which include homopolymers, copolymers and block copolymers of polyacetal. Polyacetal resin (c) for use in the structural member (C) contains hydroxyalkyl groups at the molecule terminals, as already described in detail as to polyacetal resin (a-1) and also includes a mixture comprising polyacetal copolymer whose hydroxyalkyl group terminal concentration is not less than $5\times10^{-5}$ mole per mole of oxymethylene units and polyacetal polymer whose hydroxyalkyl group concentration at the molecule terminals is less than $5\times10^{-5}$ mole per mole of oxymethylene units. These polyacetal resins (c) can be used alone or in mixture of at least two thereof.

MFR of polyacetal resin (c) is not particularly limited, but can be selected as desired in such a range as not to deteriorate the effects of the present integrated structure, and is preferably 0.1–200 g/10 min., more preferably 0.1–120 g/10 minutes.

When polyacetal resin (c) for the structural member (C) is polyacetal copolymer, its melting point is preferably 140°–175° C.

Furthermore, polyacetal resin (c) for structural member (C) can be mixed with at least one of so far well known additives such as a heat stabilizer, an antioxidant, a weather (light) resistant stabilizer, a mold-releasing agent, a lubricant, a crystal-nucleating agent and an antistatic agent, if required, in a desired amount. Furthermore, inorganic fillers such as glass fibers, talc, wollastonite, hydrotalcite, etc.; carbon black; pigment, etc. can be also added thereto, if required, in a desired amount. Specific examples of these additives, etc. are the same as those already given as additives to the resin composition (a).

Polyacetal resin (c) for the structural member (C) can be also preferably used as thermoplastic resin (b) for the structural member (B).

Thermoplastic resin integrated structure herein referred to has at least one structure of structural member (A) and structural member (B) as integrated together side by side. Such as integrated structure of structural member (A) and structural member (B) as integrated together side by side can be obtained by applying welding or a molding process such as injection molding of different materials, resin insert injection molding, coextrusion molding of different materials, multilayer blow molding, etc. to and between the structural member (A) and the structural member (B).

The present thermoplastic resin integrated structure, when it contains structural member (C), has at least one structure of structural member (C)-structural member (A) structural member (B) as integrated together in this order. Such an integrated structure of structural members (C)-(A)-(B) can be obtained by applying welding or a molding process such as injection molding of different material, resin insert injection molding, coextrusion molding of different materials, multilayer blow molding, etc. to and between the individual structure members (C), (A) and (B).

"Structural member" herein referred to means a molded part of a resin composition formed by a well-known injection molding, extrusion molding, blow molding, press molding or the like. The structural member can be formed in a various of shapes such as tabular shapes, stick shapes, columnar shapes, conical shapes, polygonal shapes or a combination thereof.

The present thermoplastic resin integrated structure can have a plurality of structures of structural member (A) and structural member (B) as integrated together side by side or a plurality of structures of structural member (C)-structural member (A)-structural member (B) as integrated together in this order, or further can have both of the structure of structural member (A) and structural member (B) as integrated together side by side and the structure of structural member (C)-structural member (A)-structural member (B) as integrated together in this order.

Furthermore, the present thermoplastic resin integrated structure can have a structure of other member molded from thermoplastic elastomer of polyurethane series, polyester series, polyamide series, etc. or the like, integrated with the aforementioned structural members, where the desired structure can be obtained by applying welding or a molding process such as injection molding of different materials based on a plurality of resin components, resin insert injection molding, coextrusion molding of different materials based on a plurality of members, multilayer blow molding of a plurality of members, etc. to and between the other member and the structural members.

In the present invention, the structural members (B) and (C) may be molded from the same components.

In the integrated structure of structural members (C)-(A)-(B) as integrated together in this order, on the other hand, where the structural members (B) and (C) are molded from different components and the structural members molded from such different components are integrated together into the structure through the structural member (A) as an intermediate, and if the structural member (A) is molded from a composition of a single composition, the composition of the resin components for use in molding of structural member (A) must be selected, while carefully considering balances in bonding strength between the structural members (A) and (B) and also between the structural members (A) and (C). Such careful consideration of balances in bonding strength has a possibility to narrow the breadth of choice of the composition of the resin components in the composition for use in molding of structural member (A) in specific applications.

When the structural member (A) is composed of a combination (such as "laminate") of at least two elements each formed from different resin compositions (a) in such a case, composition for resin composition (a-1) in the structural member (A) in contact with the structural member (B) and composition for resin composition (a-1) in the structural member (A) in contact with the structural member (C) can be independently selected to obtain a sufficiently high bonding strength between the structural members (A) and (B) and also between the structural members (A) and (C), thereby forming a totally strong thermoplastic resin integrated structure.

In the present invention, the structural member (A) can be composed of at least two elements each molded from resin compositions (a) with different compositions of resin components. That is, in this structural member (A), the proportion of the resin (a-1) to the resin (a-2) in one element molded from the resin composition (a) is different from that in another element molded from the resin composition (a). In such a case, it is preferable that the content of polyacetal resin (a-1) in an element in contact with the structural member (C) is larger than that of polyacetal resin (a-1) in another element in contact with the structural member (B).

When the structural member (A) is composed of a combination of at least three elements, it is preferable that the contents of polyacetal resin (a-1) in the individual elements are gradually decreased from the element in direct contact with the structural member (C) toward the element in direct contact with the structural member (B).

Description will be made in detail below of procedures for welding or integrating the individual structural members of the present structure.

Structural member (A) can be integrated with structural member (B) by (a) welding, (b) injection molding of different materials, (c) resin insert molding, (d) coextrusion molding of different materials, (e) multilayer blow molding, etc. To (a) welding, such well known procedures are applicable as (1) hot gas welding for fusing weld parts of structural members, using air or gas as a heating source, (2) hot plate welding for fusing weld parts by heating weld parts of structural members through direct contact with a heated hot plate or heating instrument or by radiant heat without direct contact thereof, (3) heat seal welding or impulse seal welding, using a heating ribbon, (4) high frequency welding for fusing weld parts of structural members by applying a high frequency electric field to the weld parts, thereby causing intermolecular frictions, (5) ultrasonic welding for fusing weld parts by ultrasonic vibration, (6) friction welding for fusing weld parts of structural members by causing friction between the weld parts, (7) laser welding for fusing weld parts by mixing resin with a laser-absorbing material such as carbon black, etc. in advance, and exposing the resin to lasers of diode, YAG, excimer, etc., (8) welding using infrared rays, flames, solar heat, etc. as a heat source, and the like.

Above all, hot plate welding, high frequency welding, ultrasonic welding and laser welding are preferable.

Welding procedure comprising laying individual structural members molded in advance one upon another and fusing the structural members by a press molding machine, using a press hot plate as a heat source, followed by compression under pressure can be preferably used, where at least three structural members can be welded together at the same time.

To (b) injection molding of different materials are applicable so far well known procedures. For example, resin composition (a) to serve as structural member (A) may be injection molded at first, and then thermoplastic resin (b) to serve as structural member (B) may be injection molded, or vice versa, where the successive resin component may be injection molded after the preceding injected resin component has been cooled and thoroughly solidified in a mold or before the preceding injected resin component has been thoroughly solidified in the mold. So far as the structural members (A) is integrated with (B) side by side, molding of different materials may be carried out, using other component than resin composition (a) and thermoplastic resin (b).

(c) Resin insert injection molding is a procedure comprising molding structural member (A) or (B) in advance by a so far well known molding process, setting the molding in a desired position in a mold, and then injection molding resin component to serve as the remaining structural member thereon, which is preferably used in the present invention.

(d) Coextrusion molding of different materials can be also preferably used in the present invention. So far as the structural member (A) is integrated with the structural member (B) side by side, the structural members (A) and (B) may be coextrusion molded together with other component to form at least 3 layers.

(e) Multilayer blow molding can be also preferably used in the present invention. So far as the structural member (A) is integrated with the structural member (B) side by side, the structural members (A) and (B) can be multilayer blow molded together with other component in this procedure to form at least three layers.

Description will be made below of an integrated structure of structural member (C)-structural member (A)-structural member as integrated together in this order.

Integrated structure of structural member (A) and structural member (B) can be preferably molded by the same procedures as described above. Integrated structure of structural member (C) and structural member (A) can be also prepared by such procedures as (a) welding, (b) injection molding of different materials, (c) resin insert molding, (d) coextrusion molding of different materials, (e) multilayer blow molding, etc., specific preferable procedures of which are the same as described above.

Integration of structural members (C)-(A)-(B) in this order can be made by integrating the structural member (A) with the structural member (B) and then integrating the structural member (C) with the structural member (A), or by integrating the structural member (C) with the structural member (A) and then integrating the structural member (A) with the structural member (B). Or, structural members (C)-(A)-(B) may be integrated at the same time by molding. Molding procedures and sequence of molding are properly selected on the basis of product shapes, end services, surrounding service conditions, economics, etc.

The conventional integrated structure comprises a structural member of polyacetal-based resin and a structural member of other thermoplastic resin, typically polyethylene fails to meet a practical level, but the present integrated structure comprises a structural member (A) molded from a mixture of specific polyacetal resin (a-1) with resin (a-2) and a structural member (B) molded from thermoplastic resin (b) has a distinguished bonding strength between the structural members and is useful for automobile parts, electric and electronic equipment parts, OA-related parts, various parts of industrial sundries, etc.

Figure 3:
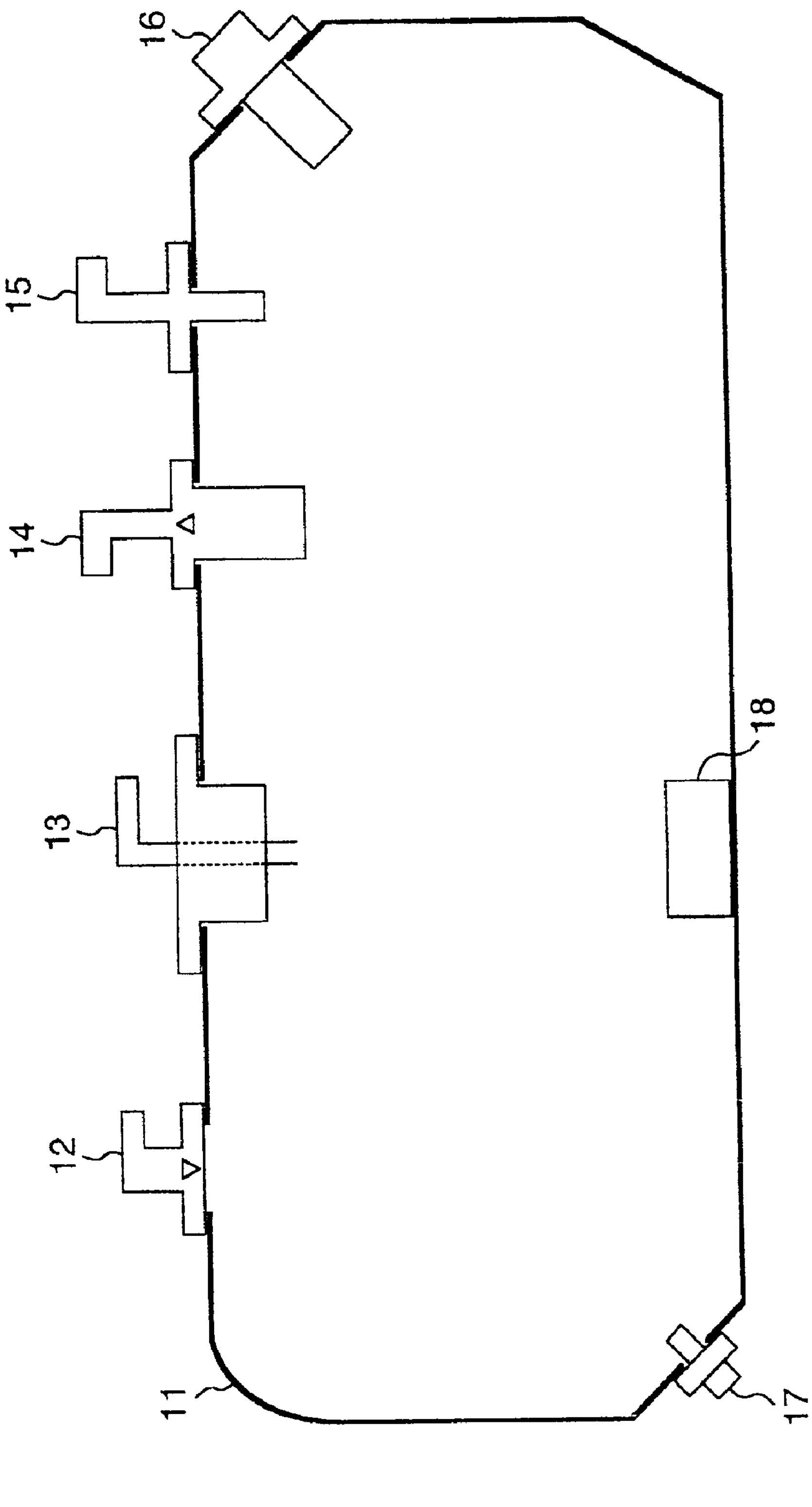
FIG. 3 is a conceptual view of an automobile fuel tank with valves, tubes, flanges, etc. on the basis of the present integrated structures.

The present integrated structure is particularly preferable for automobile parts, more preferable for various parts used in integration of a fuel tank made from resin with other tank, as shown in FIG. 3, where numeral 11 shows a multilayer blow molded automobile fuel tank with a polyethylene outermost layer, 12 a pressure relief valve integrated with the automobile fuel tank, 13 a flange for fuel sender module integrated with the automobile fuel tank, 14 a float valve provided in vent line integrated with the automobile fuel tank, 15 a tube provided in recirculation line integrated with the automobile fuel tank, 16 a fuel inlet tube integrated with the automobile fuel tank, 17 a drain valve integrated with the automobile fuel tank, and 18 a rotary tank integrated with the automobile fuel tank.

Specific examples of the parts include:

Various valves such as float valves, ball valves, tubes or flanges, provided in various breezer lines such as vent line, recirculation integrated with various multilayer blow molded fuel tanks with a polyethylene resin outermost layer.

Various valves such as float valves, ball valves, tubes or flanges, provided in fuel injection line.

Valves such as drain valves, tubes or flanges, provided in drain line.

Valves such as pressure relief valves, tubes or flanges, provided in lines functioning to relieve pressure from fuel tanks to the outside.

Fuel sender module and its flanges, etc.

Canister and its flanges, and Rotary tanks, etc. provided at the tank bottom to prevent fuel feed pump cavitation during the engine running.

Furthermore, the present joined structure can be preferably used also for automobile fuel tanks.

DESCRIPTION OF PREFERRED EMBODIMENTS

The present invention will be described in detail below, referring to Examples, which should be interpreted not to be restrictive of the present invention.

Items of determination and their conditions in Examples will be described below.

(1) Quantitative determination of hydroxyalkyl groups in polyacetal copolymer composition:

Polyacetal copolymer composition was reacted with acetic anhydride at a temperature of 148±2° C. for two hours to acetylate groups —OH at terminals and number of acetylated terminals was quantitatively determined by infrared absorption spectrum to evaluate the number in terms of moles per mole of oxymethylene units.

Figure 2:
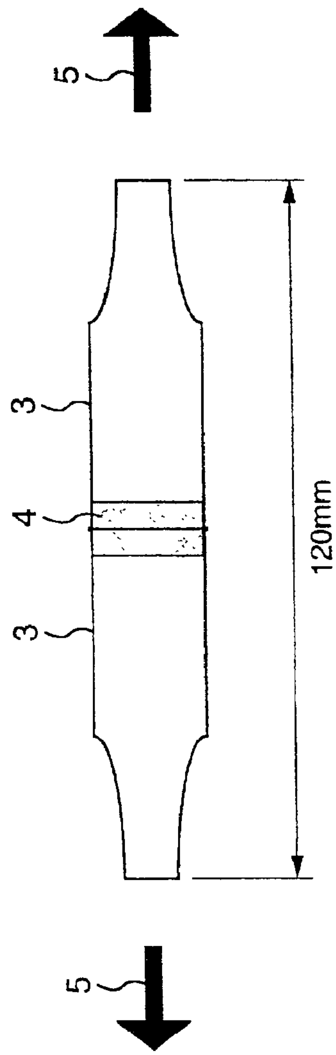
FIG. 2 is a front view of a tensile test piece.

(2) Evaluation of bonding strength between structural members:

Test piece welded by hot plate non-contact welding, as shown in FIG. 2 was stretched in both directions shown by 5 and 5 in FIG. 2 at a stretching rate of 5 mm/min by an autograph model AG-1000B, made by Shimadzu Corp. to determine its bonding strength.

EXAMPLE 1

A biaxial paddle-type continuous polymerizer with a jacket capable of passing a heating therethrough was adjusted to 80° C., and trioxane containing 4 ppm of water and formic acid in total and 1,3-dioxolane as a cyclic formal were fed to the polymerizer at rates of 40 moles/hr and 2 moles/hr, respectively, and boron trifluoride di-n-butyl etherate as a polymerization catalyst dissolved in cyclohexane and methylal $[(CH_3O)_2CH_2]$ as a chain transfer agent were continuously fed thereto to make the former concentration of $5\times10^{-5}$ mole/mole of trioxane and the latter concentration of $2\times10^{-3}$ mole/mole of trioxane, thereby conducting polymerization.

Polymers discharged from the polymerizer were led into an aqueous 1% triethylamine solution to deactivate the polymerization catalyst. Then, the polymers were filtered and washed, and triethyl (2-hydroxyethyl) ammonium formate as a quaternary ammonium salt was added to one part by weight of crude polyacetal copolymer resulting from the filtration and washing so as to make 20 ppm by weight in terms of nitrogen, using the aforementioned formula (5), followed by uniform mixing and drying at 120° C. for 6 hours.

Then, 0.3 parts by weight of triethylene glycol-bis-(3-(3-t-butyl-5-methyl-4-hydroxyphenyl)-propionate) was added to 100 parts by weight of the dried crude polyacetal copolymer, and the mixture was fed to a vented biaxial screw extruder. Two parts by weight of an aqueous triethylamine solution adjusted to water: triethylamine=80:1 was added to 100 parts by weight of the polyacetal copolymer melted in the extruder to decompose unstable terminals at an extruder temperature set to 200° C. for an extruder residence time of 5 minutes. After the decomposition treatment of the unstable terminals the polyacetal copolymer was deaerated at vent vacuum degree of 20 Torr and extruded from the extruder die as strands, followed by pelletizing [polyacetal copolymer (a1-1)].

A portion of the polyacetal copolymer (a1-1) thus obtained was subjected to quantitative determination of terminal hydroxyalkyl group. The result is shown in Table 1.

Then, 26.6 parts by weight of high density polyethylene (Novatec HDHJ330, trademark of a product made by Japan Polychem K.K., which will be hereinafter referred to as "PO-1") as resin component (a-2) [21.0 wt. % as component (a-2)] and 0.5 parts by weight of nylon 6-6 adjusted to average particle size of 4$\mu$ as a heat stabilizer were added to 100 parts by weight of the polyacetal copolymer (a1-1) and uniformly mixed therewith, and the mixture was fed to the aforementioned biaxial extruder, and remelted and kneaded to obtain pellets.

The pellets were dried at 80° C. for 24 hours and molded into an ASTM No. 1 dumbbell (3.2 mm thick, A1) through a molding machine (Model SH-75, made by Sumitomo Heavy Industries, Ltd.) adjusted to a cylinder temperature of 200° C. and a mold temperature of 70° C.

On the other hand, high density polyethylene PO-1 as thermoplastic resin (b) was molded into an ASTM No. 1 dumbbell (3.2 mm thick, B1) through the molding machine (Model SH-75, made by Sumitomo Heavy Industries, Ltd.) adjusted to a cylinder temperature of 200° C. and a mold temperature of 70° C.

Zones (1.5 mm long in the longitudinal direction) shown as margins 2 left for welding at the ends of ASTM No. 1 dumbbells (A1 and B1) in FIG. 1 were heated and fused by a heat plate adjusted to a surface temperature of 450° C. for 30 seconds according to a non-contact heating system by radiant heat to weld the fused parts of dumbbells (A1 and B1), followed by cooling for 90 seconds. Then, a test piece (120 mm in total length) was cut from the welded dumbbells to make the welded parts 4 a center as shown in FIG. 2 and the welded dumbbells 3 and 3 were stretched in both directions 5 and 5 to measure a bonding strength. The result is shown in Table 1.

EXAMPLE 2

Operations and molding were carried out in the same manner as in Example 1, except that 60 parts by weight of PO-1 [37.5 wt. % as component (a-2)] was added to 100 parts by weight of the polyacetal copolymer (a1-1) used in Example 1, thereby obtaining an ASTM No. 1 dumbbell (A2).

Dumbbells (A2 and B1) were subjected to the same welding treatment as in Example 1 and the bonding strength was measured. The result is shown in Table 1.

EXAMPLE 3

Operations and molding were carried out in the same manner as in Example 1, except that 40 parts by weight of maleic anhydride-modified ethylene-butene-1 copolymer, graft copolymerized with 0.9 parts by weight of maleic anhydride [density: 0.89 g/$cm^3$, degree of crystallization: 15%; 28.6 wt. % as component (a-2)], which will be hereinafter referred to as "PO-2", was added to 100 parts by weight of the polyacetal copolymer (a1-1) used in Example 1, thereby obtaining an ASTM No. 1 dumbbell (A3).

Dumbbells (A3 and B1) were subjected to the same welding treatment as in Example 1, and the bonding strength was measured. The result is shown in Table 1.

EXAMPLE 4

Polymerization and post-treatment were carried out in the same manner as in Example 1, except that $2\times10^{-3}$ mole of methanol was used as a chain transfer agent in place of methylal of Example 1 per mole of trioxane, thereby obtaining pellets [polyacetal copolymer (a4-1)].

A portion of the polyacetal copolymer (a4-1) thus obtained was subjected to quantitative determination of terminal hydroxyalkyl groups. The result is shown in Table 1.

Operations and molding were carried out in the same manner as in Example 1, except that 40 parts by weight of PO-2 used in Example 3 [28.6 wt. % as component (a-2)] and 0.04 parts by weight of calcium monopalmitate-stearate as a heat stabilizer were added to 100 parts by weight of the polyacetal copolymer (a4-1), thereby obtaining an ASTM No. 1 dumbbell (A4).

Dumbbells (A4 and B1) were subjected to the same welding treatment as in Example 1. The bonding strength was measured. The result is shown in Table 1.

EXAMPLE 5

Trioxane containing 4 ppm of water and formic acid in total and 1,3-dioxolane as a cyclic formal were fed to a polymerizer at rates of 40 moles/hr and 2 moles/hr, respectively. Then, boron trifluoride di-n-butyl etherate dissolved in cyclohexane as a polymerization catalyst and polyethylene with hydroxyl groups at both terminals (Mn=5,000) as a chain transfer agent were continuously fed thereto to make the former concentration of $10\times10^{-5}$ mole per mole of trioxane and the latter concentration of $0.5\times10^{-5}$ mole per mole of trioxane, thereby conducting polymerization. Operations were carried out in the same manner as in Example 1 except the foregoing polymerization, thereby obtaining pellets [polyacetal copolymer (a5-1)].

A portion of the polyacetal copolymer (a5-1) thus obtained was subjected to quantitative determination of terminal hydroxyalkyl groups. The result is shown in Table 1.

30 parts by weight of maleic anhydride graft-modified ethylene-octene-1 copolymer (hereinafter referred to as "PO-3"), which was obtained by graft copolymerizing ethylene-octene-1 copolymer prepared by a process disclosed in JP-A-3-163088, using (t-butylamido)-(tetramethyl-η5-cyclopentadienyl)-1,2-ethanediyltitanium dichloride as a catalyst with 0.9 parts by weight of maleic anhydride, was added to 100 parts by weight of the polyacetal copolymer (a5-1), and further 0.04 parts by weight of calcium monopalmitate-monostearate [23.1 wt. % as component (a-2)] was also added as a heat stabilizer thereto, followed by uniform mixing. Then, the mixture was fed to the aforementioned biaxial extruder, remelted and kneaded to obtain pellets. The pellets were molded into an ASTM No. 1 dumbbell in the same manner as in Example 1 (A5).

Dumbbells (A5 and B1) were subjected to the same welding treatment as Example 1. The bonding strength was measured. The result is shown in Table 1.

EXAMPLE 6

Trioxane containing 4 ppm of water and formic acid in total and 1,3-dioxolane as cyclic formal were fed to a polymerizer at rates of 40 moles/hr and 1 mole/hr, respectively, and boron trifluoride di-n-butyl etherate dissolved in cyclohexane as a polymerization catalyst and hydrogenated polybutadiene with hydroxyl groups at both terminals represented by the following formula (7) as a chain transfer agent [where ($CH_2CH_2CH_2CH_2$) units and ($C(CH_2CH_3)HCH_2$) units were distributed at random for 37 moles and for 8 moles, respectively; number average molecular weight Mn: 2,330] were continuously fed thereto to make the former concentration of $10\times10^{-5}$ mole per mole of trioxane and the latter concentration of $1\times10^{-3}$ mole per mole of trioxane, thereby conducting polymerization. Operations were carried out in the same manner as in Example 1 except the foregoing polymerization, thereby obtaining pellets [polyacetal copolymer (a6-1)]:

$$HO-(CH_2)_2-[C(CH_2CH_3)HCH_2]_8-[CH_2CH_2CH_2CH_2]_{37}-(CH_2)_2-OH \quad (7)$$

A portion of the polyacetal copolymer (a6-1) thus obtained was subjected to quantitative determination of terminal hydroxyalkyl groups. The result is shown in Table 1.

Operations and molding were carried out in the same manner as in Example 1, except that 30 parts by weight of PO-2 used in Example 3 [23.1 wt. % as component (a-2)] and 0.04 parts by weight of calcium monopalmitate-monostearate as a heat stabilizer were added to 100 parts by weight of the polyacetal copolymer (a6-1), thereby obtaining an ASTM No. 1 dumbbell (A6).

Dumbbells (A6 and B1) were subjected to the same welding treatment as in Example 1. The bonding strength was measured. The result is shown in Table 1.

EXAMPLE 7

Trioxane containing 4 ppm of water and formic acid in total and 1,3-dioxolane as cyclic formal were fed to a polymerizer at rates of 40 moles/hr and 2 moles/hr, respectively, and further boron trifluoride di-n-butyl etherate dissolved in cyclohexane as a polymerization catalyst and hydrogenated polybutadiene with hydroxyl groups at both terminals represented by the following formula (8) as a chain transfer agent [where ($CH_2CH_2CH_2CH_2$) units and ($C(CH_2CH_2)HCH_2$) units were distributed at random for 12 moles and 47 moles, respectively; number average molecular weight: 3,390] were continuously fed thereto to make the former concentration of $10\times10^{-5}$ mole per mole of trioxane and the latter concentration of $1\times10^{-3}$ mole per mole of trioxane, thereby conducting polymerization. Operations were carried out in the same manner as in Example 1 except the foregoing polymerization, thereby obtaining pellets [polyacetal copolymer (a7-1)]:

$$HO-(CH_2)_2-[C(CH_2CH_3)HCH_2]_{47}-[CH_2CH_2CH_2CH_2]_{12}-(CH_2)_2-OH \quad (8)$$

A portion of the polyacetal copolymer (a7-1) thus obtained was subjected to quantitative determination of terminal hydroxyalkyl groups. The result is shown in Table 2.

Operations and molding were carried out in the same manner as in Example 1, except that 50 parts by weight of PO-2 used in Example 3 [33.3 wt. % as component (a-2)] and 0.04 parts by weight of calcium monopalmitate-monostearate as a heat stabilizer were added to 100 parts by weight of the polyacetal copolymer (a7-1), thereby obtaining an ASTM No. 1 dumbbell (A7).

Dumbbells (A7 and B1) were subjected to the same welding treatment as in Example 1. The bonding strength was measured. The result is shown in Table 2.

EXAMPLE 8

Polyacetal copolymer (a1-1) used in Example 1 and polyacetal copolymer (a7-1) used in Example 7 were blended together in a ratio of 4:6 and fed to a vented biaxial screw extruder [polyacetal copolymer (a8-1)].

A portion of polyacetal copolymer (a8-1) thus obtained was subjected to quantitative determination of terminal hydroxyalkyl groups. The result is shown in Table 2.

Operations and molding were carried out in the same manner as in Example 1, except that 50 parts by weight of PO-2, 10 parts by weight of polyethylene copolymer having an MFR of 3.0, copolymerized with 12 wt. % glycidyl methacrylate [hereinafter referred to as "PO-4"; 37.5 wt. % as component (a-2)] as component (a-2) and 0.5 parts by weight of nylon 6-6 adjusted to an average particle size of 4 $\mu$m as a heat stabilizer were added to 100 parts by weight of the polyacetal copolymer (a8-1), thereby obtaining an ASTM No. 1 dumbbell (A8).

Dumbbells (A8 and B1) were subjected to the same welding treatment as in Example 1. The bonding strength was measured. The result is shown in Table 2.

EXAMPLE 9

Operations and molding were carried out in the same manner as in Example 1, except that 50 parts by weight of maleic anhydride-modified high density polyethylene polymer having an MFR of 3.0 and a maleic anhydride modification rate of 0.3% [hereinafter referred to as "PO-5"; 33.3 wt. % as component (a-2)] and 0.5 parts by weight of nylon 6-6 adjusted to an average particle size of 4 $\mu$m as a heat stabilizer were added to 100 parts by weight of the polyacetal copolymer (a8-1) used in Example 8, thereby obtaining an ASTM No. 1 dumbbell (A9).

Dumbbells (A9 and B1) were subjected to the same welding treatment as in Example 1. The bonding strength was measured. The result is shown in Table 2.

EXAMPLE 10

Operations and molding were carried out in the same manner as in Example 1, except that 50 parts by weight of PO-5 and 72.2 parts by weight of PO-1 as component (a-2) [55.0 wt. % as component (a-2)], and 0.5 parts by weight of nylon 6-6 adjusted to an average particle size of 4 $\mu$m as a heat stabilizer were added to 100 parts by weight of the polyacetal copolymer (a8-1) used in Example 8, thereby obtaining an ASTM No. 1 dumbbell (A10).

Dumbbells (A10 and B1) were subjected to the same welding treatment as in Example 1. The bonding strength was measured. The result is shown in Table 2.

EXAMPLE 11

Operations and molding were carried out in the same manner as in Example 1, except that 50 parts by weight of PO-5 as component (a-2), 100 parts by weight of PO-1 [60.0 wt. % as component (a-2)], and 0.5 parts by weight of nylon 6-6 adjusted to an average particle size of 4 $\mu$m as a heat stabilizer were added to 100 parts by weight of the polyacetal copolymer (a8-1) used in Example 8, thereby obtaining an ASTM No. 1 dumbbell (A11).

Dumbbells (A11 and B1) were subjected to the same welding treatment as in Example 1. The bonding strength was measured. The result is shown in Table 2.

EXAMPLE 12

Operations and molding were carried out in the same manner as in Example 1, except that 50 parts by weight of PO-5 as component (a-2), 135.7 parts of PO-1 [65.0 wt. % as component (a-2)], and 0.5 parts by weight of nylon 6-6, adjusted to an average particle size of 4 $\mu$m as a heat stabilizer were added to 100 parts by weight of the polyacetal copolymer (a8-1) used in Example 8, thereby obtaining an ASTM No. 1 dumbbell (A12).

Dumbbells (A12 and B1) were subjected to the same welding treatment as in Example 1. The bonding strength was measured. The result is shown in Table 2.

EXAMPLE 13

Operations and molding were carried out in the same manner as in Example 1, except that 50 parts by weight of PO-5 and 183.3 parts by weight of PO-1 as component (a-2) [70.0 wt. % as component (a-2)], and 0.5 parts by weight of nylon 6-6 adjusted to an average particle size of 4 $\mu$m as a heat stabilizer were added to 100 parts by weight of the polyacetal copolymer (a8-1) used in Example 8, thereby obtaining an ASTM No. 1 dumbbell (A13).

Dumbbells (A13 and B1) were subjected to the same welding treatment as in Example 1. The bonding strength was measured. The result is shown in Table 3.

EXAMPLE 14

Operations and molding were carried out in the same manner as in Example 1, except that 50 parts by weight of PO-5 and 350 parts by weight of PO-1 as component (a-2) [80.0 wt. % as component (a-2)], and 0.5 parts by weight of nylon 6-6 adjusted to an average particle size of 4 $\mu$m were added to 100 parts by weight of the polyacetal copolymer (a8-1) used in Example 8, thereby obtaining an ASTM No. 1 dumbbell (A14).

Dumbbells (A14 and B1) were subjected to the same welding treatment as in Example 1. The bonding strength was measured. The result is shown in Table 3.

Comparative Example 1

0.5 Parts by weight of nylon 6-6 adjusted to an average particle size of 4 $\mu$m as a heat stabilizer was added to 100 parts by weight of the polyacetal copolymer (a1-1) used in Example 1, followed by uniform mixing, and the mixture was fed to a biaxial extruder, and remelted and kneaded in the same manner as in Example 1, thereby obtaining pellets. The pellets were dried at 80° C. for 24 hours and then molded into an ASTM No. 1 dumbbell (A'1) through a molding machine [Model SH-75 made by Sumitomo Heavy Industries, Ltd.] adjusted to a cylinder temperature of 200° C. and a mold temperature of 70° C.

Dumbbells (A'1 and B1) were subjected to the same welding treatment as in Example 1. The bonding strength was measured. The result is shown in Table 3.

Comparative Example 2

Operations and molding were carried out in the same manner as in Example 1, except that 11.2 parts by weight of PO-1 as component (a-2) [10.1 wt. % as component (a-2)] was added to 100 parts by weight of the polyacetal copolymer (a1-1) used in Example 1, thereby obtaining pellets. The pellets were dried at 80° C. for 24 hours and then molded into an ASTM No. 1 dumbbell (A'2) through a molding machine [Model SH-75, made by Sumitomo Heavy Industries, Ltd.] adjusted to a cylinder temperature of 200° C. and a mold temperature of 70° C.

Dumbbells (A'2 and B1) were subjected to the same welding treatment as in Example 1. The bonding strength was measured. The result is shown in Table 3.

Comparative Example 3

0.04 Parts by weight of calcium monopalmitate-monostearate as a heat stabilizer was added to 100 parts by weight of the polyacetal copolymer (a4-1) used in Example 4, followed by uniform mixing. Then, the mixture was fed to a biaxial extruder, and remelted and kneaded in the same manner as in Example 1, thereby obtaining pellets. The pellets were dried at 80° C. for 24 hours and then molded into an ASTM No. 1 dumbbell (A'3) through a molding machine [Model SH-75, made by Sumitomo Heavy Industries, Ltd.] adjusted to a cylinder temperature of 200° C. and a mold temperature of 70° C.

Dumbbells (A'3 and B1) were subjected to the same welding treatment as in Example 1. The bonding strength was measured. The result is shown in Table 3.

TABLE 1

| | | Example 1 | Example 2 | Example 3 | Example 4 | Example 5 | Example 6 |
|---|---|---|---|---|---|---|---|
| Component (a-1) | Polymer species | (a1-1) | (a1-1) | (a1-1) | (a4-1) | (a5-1) | (a6-1) |
| | Terminal group concentration[1)] | $1.3 \times 10^{-5}$ | $1.3 \times 10^{-5}$ | $1.3 \times 10^{-5}$ | $6.7 \times 10^{-4}$ | $3.3 \times 10^{-4}$ | $6.6 \times 10^{-4}$ |
| | Component ratio ① [2)] | 79.0 wt % | 62.5 wt % | 71.4 wt % | 71.4 wt % | 76.9 wt % | 76.9 wt % |
| Component (a-2) | Polymer species ① | PO-1[4)] | PO-1[4)] | PO-2[5)] | PO-2[5)] | PO-3[6)] | PO-2[5)] |
| | Component ratio ② [3)] | 100 wt % | 100 wt % | 100 wt % | 100 wt % | 100 wt % | 100 wt % |
| | Polymer species ② | | | | | | |
| | Component ratio ② [3)] | | | | | | |
| | Component ratio ① [2)] | 21.0 wt % | 37.5 wt % | 28.6 wt % | 28.6 wt % | 23.1 wt % | 23.1 wt % |
| Component (b) | Polymer species | PO-1[4)] | PO-1[4)] | PO-1[4)] | PO-1[4)] | PO-1[4)] | PO-1[4)] |
| Bonding strength (MPa) | | 4.4 | 5.3 | 6.2 | 6.4 | 7.9 | 8.0 |

[1)]Moles of hydroxyalkyl groups per mole of oxymethylene
[2)]Percent by weight on the basis of resin composition (a)
[3)]Percent by weight as component (a-2)
[4)]PO-1; High density polyethylene (Novatec HDHJ330, trademark of a product made by Japan Polychem K.K.)
[5)]PO-2; Maleic anhydride-modified ethylene-butene-1 copolymer
[6)]PO-3; Maleic anhydride-modified ethylene-octene-1 copolymer

TABLE 2

| | | Example 7 | Example 8 | Example 9 | Example 10 | Example 11 | Example 12 |
|---|---|---|---|---|---|---|---|
| Component (a-1) | Polymer species | (a7-1) | (a8-1) | (a8-1) | (a8-1) | (a8-1) | (a8-1) |
| | Terminal group concentration[1)] | $6.7 \times 10^{-4}$ | $4.1 \times 10^{-4}$ | $4.1 \times 10^{-4}$ | $4.1 \times 10^{-4}$ | $4.1 \times 10^{-4}$ | $4.1 \times 10^{-4}$ |
| | Component ratio ① [2)] | 66.7 wt % | 71.4 wt % | 66.7 wt % | 45.0 wt % | 40.0 wt % | 35.0 wt % |
| Component (a-2) | Polymer species ① | PO-2[5)] | PO-2[5)] | PO-5[8)] | PO-5[8)] | PO-5[8)] | PO-5[8)] |
| | Component ratio ② [3)] | 100 wt % | 83.3 wt % | 100 wt % | 40.9 wt % | 33.3 wt % | 26.9 wt % |
| | Polymer species ② | | PO-4[7)] | | PO-1[4)] | PO-1[4)] | PO-1[4)] |
| | Component ratio ② [3)] | | 16.7 wt % | | 59.1 wt % | 66.7 wt % | 73.1 wt % |
| | Component ratio ① [2)] | 33.3 wt % | 37.5 wt % | 33.3 wt % | 55.0 wt % | 60.0 wt % | 65.0 wt % |
| Component (b) | Polymer species | P)-1[4)] | PO-1[4)] | PO-1[4)] | PO-1[4)] | PO-1[4)] | PO-1[4)] |
| Bonding strength (MPa) | | 9.4 | 11.6 | 9.2 | 10.4 | 11.8 | 13.6 |

[1)]Moles of hydroxyalkyl groups per mole of oxymethylene
[2)]Percent by weight on the basis of resin composition (a)
[3)]Percent by weight as component (a-2)
[4)]PO-1; High density polyethylene (Novatec HDHJ330, trademark of a product made by Japan Polychem K.K.)
[5)]PO-2; Maleic anhydride-modified ethylene-butene-1 copolymer
[7)]PO-4; Glycidylmethacrylate-ethylene copolymer
[8)]PO-5; Maleic anhydride-modified high density polyethylene polymer

TABLE 3

| | | Example 13 | Example 14 | Comp. Ex. 1 | Comp. Ex. 2 | Comp. Ex. 3 |
|---|---|---|---|---|---|---|
| Component (a-1) | Polymer species | (a8-1) | (a8-1) | (a1-1) | (a1-1) | (a4-1) |
| | Terminal group concentration[1)] | $4.1 \times 10^{-4}$ | $4.1 \times 10^{-4}$ | $1.3 \times 10^{-5}$ | $1.3 \times 10^{-5}$ | $6.7 \times 10^{-4}$ |
| | Component ratio ① [2)] | 30.0 wt % | 20.0 wt % | 100 wt % | 89.9 wt % | 100 wt % |
| Component (a-2) | Polymer species ① | PO-5 [8)] | PO-5 [8)] | — | PO-1 [4)] | — |
| | Component ratio ② [3)] | 21.4 wt % | 12.5 wt % | — | 100 wt % | — |
| | Polymer species ② | PO-1 [4)] | PO-1 [4)] | — | | — |
| | Component ratio ② [3)] | 78.6 wt % | 87.5 wt % | — | | — |
| | Component ratio ① [2)] | 70.0 wt % | 80.0 wt % | — | 10.1 wt % | — |
| Component (b) | Polymer species | PO-1 [4)] | PO-1 [4)] | PO-1 [4)] | PO-1 [4)] | PO-1 [4)] |
| Bonding strength (MPa) | | 14.0 | 14.9 | not welded | 2.1 | not welded |

1) Moles of hydroxyalkyl groups per mole of oxymethylene
2) Percent by weight on the basis of resin composition (a)
3) Percent by weight as component (a-2)
4) PO-1; High density polyethylene (Novatec HDHJ330, trademark of a product made by Japan Polychem K.K.)
8) PO-5; Maleic anhydride-modified high density polyethylene polymer

EXAMPLE 15

50 parts by weight of PO-2 and 135.7 parts by weight of PO-1 as component (a-2) [65.0 wt. % as component (a-2)], and 0.5 parts by weight of nylon 6-6 adjusted to an average particle size of 4 μm as a heat stabilizer were added to 100 parts by weight of the polyacetal copolymer (a6-1) used in Example 6, followed by uniform mixing. Then, the mixture was fed to the aforementioned biaxial extruder, remelded and kneaded, thereby obtaining pellets. The pellets were dried at 80° C. for 24 hours, and then molded into an ASTM No. 1 dumbbell (A15) through a molding machine [Model SH-75, made by Sumitomo Heavy Industries, Ltd.] adjusted to a cylinder temperature of 200° C. and a mold temperature of 70° C.

50 Parts by weight of PO-2 and 72 parts by weight of PO-1 as component (a-2) [55.0 wt. % as component (a-2)] and 0.5 parts by weight of nylon 6-6 adjusted to an average particle size of 4 μm as a heat stabilizer were added to 100 parts by weight of polyacetal copolymer (a6-1), followed by uniform mixing. Then, the mixture was fed to the aforementioned biaxial extruder, remelded and kneaded, thereby obtaining pellets. The pellets were dried at 80° C. for 24 hours, and then molded in an ASTM No. 1 dumbbell (A16) through a molding machine [Model SH-75, made by Sumitomo Heavy Industries, Ltd.] adjusted to a cylinder temperature of 200° C. and a mold temperature of 70° C.

Polyacetal resin (Tenac CHC450, trademark of a product made by Asahi Chemical Industry Co., Ltd.) was molded into an ASTM No. 1 dumbbell (C1) through a molding machine [Model SH-75, made by Sumitomo Heavy Industries, Ltd.] adjusted to a cylinder temperature of 200° C. and a mold temperature of 70° C.

ASTM No. 1 dumbbells (A15), (A16) and (C1) thus obtained, and (B1) used in Examples 1 to 14 were welded together in the following combinations by heating and fusing the zone, 1.5 mm long in the longitudinal direction, shown by margin 2 left for welding in FIG. 1 by a hot plate adjusted to a surface temperature of 250° C. for 30 seconds according to a contact heating process and welding the weld parts of couples of the dumbbells, followed by cooling for 90 seconds. Then, test pieces, 120 mm in total length, were cut out from the welded dumbbells so as to make the welded parts 4 a center as in FIG. 2, and parts 3 and 3 of the welded dumbbells were stretched in both directions 5 and 5 to measure the bonding strength. The results are shown in Table 4.

Welding combination 1: (C1)-(A16)

Welding combination 2: (A16)-(A15)

Welding combination 3: (A15)-(B1)

EXAMPLES 16 AND 17

Comparative Example 4

Dumbbells (A15), (A16), (B1) and (C1) used in Example 15 were welded together in the following combinations by heating and melting the zone, 1.5 mm long in the longitudinal direction, shown by margin 2 left for welding in FIG. 1 by a hot plate adjusted to a surface temperature of 250° C. for 30 seconds according to a conduct heating process and welding the weld parts of couples of the dumbbells, followed by cooling for 90 seconds. Then, test pieces, 120 mm in total length, were cut out from the welded dumbbells so as to make the welded parts a center as shown in FIG. 2, and parts 3 and 3 of the welded dumbbells were stretched in both directions 5 and 5 to measure the bonding strength. The results are shown in Tables 5 and 6.

EXAMPLE 16

Welding combination 1: (C1)-(A15)

Welding combination 2: (A15)-(B1)

EXAMPLE 17

Welding combination 1: (C1)-(A16)

Welding combination 2: (A16)-(B1)

Comparative Example 4

Welding combination 1: (C1)-(B1)

TABLE 4

| | (C) | Bonding strength (MPa) | (A) Bonding strength (MPa) | | | Bonding strength (MPa) | (B) |
|---|---|---|---|---|---|---|---|
| Example 15 | (C1) | 13.5 | (A16) | 13.8 | (A15) | 13.6 | (B1) |

TABLE 5

| | (C) | Bonding strength (MPa) | (A) | Bonding strength (MPa) | (B) |
|---|---|---|---|---|---|
| Example 16 | (C1) | 9.2 | (A15) | 13.6 | (B1) |
| Example 17 | (C1) | 13.5 | (A16) | 10.4 | (B1) |

TABLE 6

| | (C) | Bonding strength (MPa) | (B) |
|---|---|---|---|
| Comp. Ex. 4 | (C1) | not welded | (B1) |

EXAMPLE 18

Figure 4:
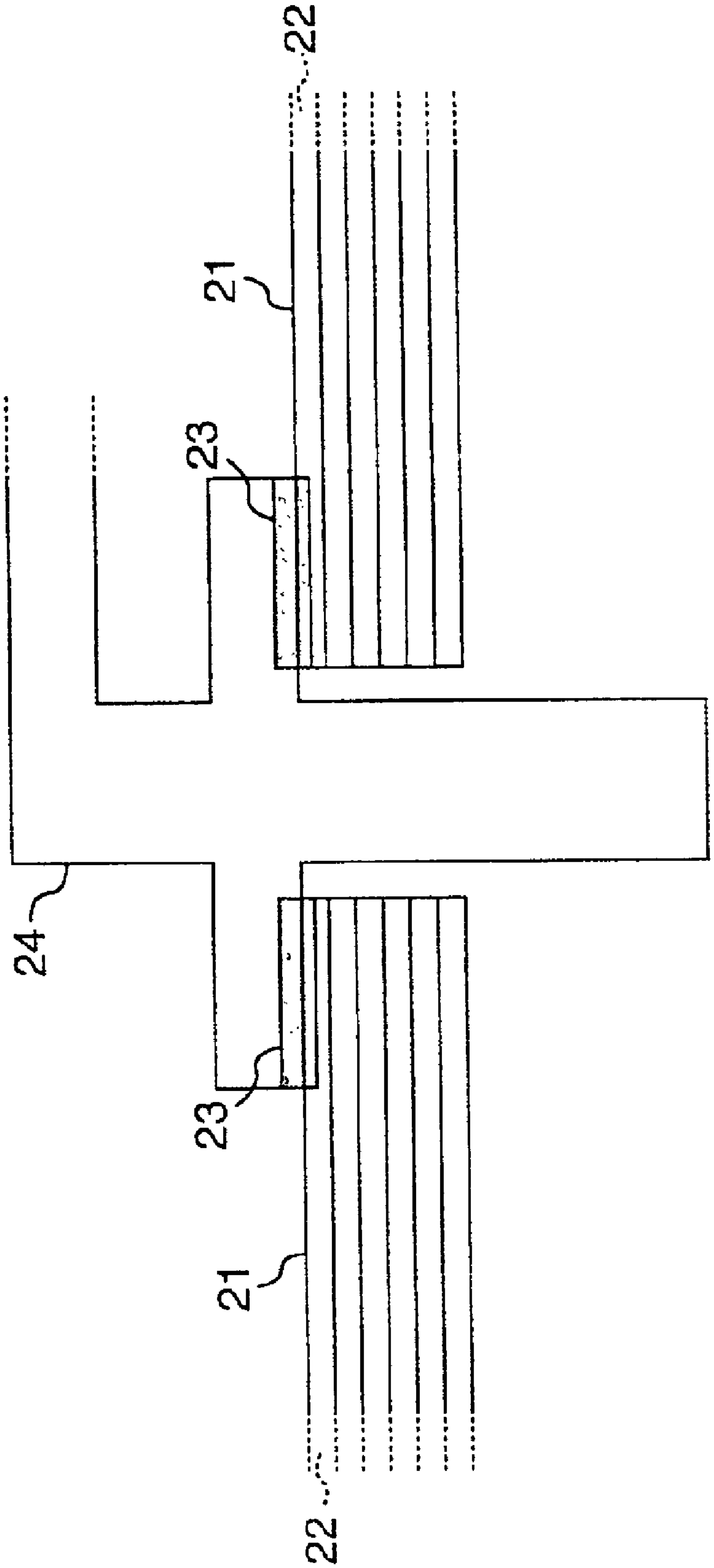
FIG. 4 is a conceptual cross-sectional view of a tube arranged in a recirculation line integrated with an automobile fuel tank on the basis of the present integrated structures.

FIG. 4 shows a product example of tube 24 provided in recirculation line and integrated with automobile fuel tank 21 at weld part 23, where automobile fuel tank 21 was blow molded in a 6-layered structure of 4 kinds of materials with polyethylene outermost layer 22 having an MFR of 7.0 determined according to ASTM-D1238 at 190° C. under a load of 21.60 kg. Tube 24 was molded from a resin composition (a) comprising 100 parts by weight of polyacetal copolymer (a8-1) used in Example 8, 50 parts by weight of PO-5 as component (a-2) [33.3 wt. % as component (a-2)], and 0.5 parts by weight of nylon 6-6 adjusted to an average particle size of 4 μm as a heat stabilizer.

EXAMPLE 19

Figure 5:
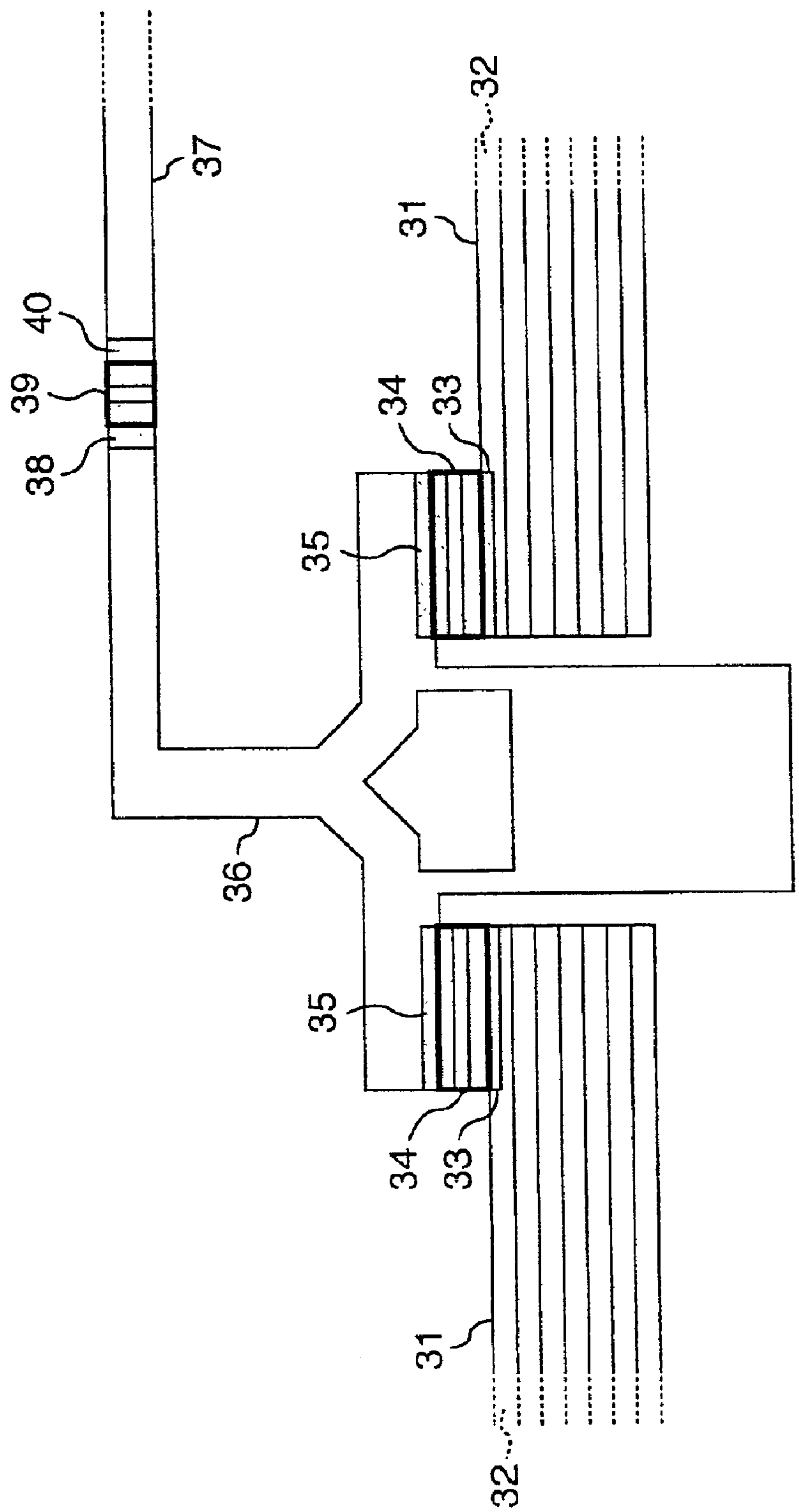
FIG. 5 is a conceptual cross-sectional view of a float valve and a bent line tube arranged in a bent line integrated with an automobile fuel tank on the basis of the present integrated structures.

FIG. 5 shows a product example of the part of float valve 36 provided in a vent line integrated with intermediate layer 34 at weld part 35 by hot plate welding through direct contact with a hot plate, the integrated part being further integrated with automobile fuel tank 31 at weld part 33 by hot plate welding through direct contact with the hot plate, where float valve 36 was composed of polyacetal copolymer composition used in Comparative Example 1 and automobile fuel tank 31 was blow molded into a 6-layered structure of 4 kinds of materials with polyethylene outermost layer 32 having an MFR of 7.0 determined according to ASTM-D1238 at 190° C. under a load of 21.60 kg. Furthermore, intermediate layer 34 was molded from resin composition (a) comprising 100 parts by weight of polyacetal copolymer (a8-1) used in Example 8, 50 parts by weight of PO-5 and 135.7 parts by weight of PO-1 as component (a-2) [65.0 wt. % as component (a-2)], and 0.04 parts by weight of calcium monopalmitate-monostearate as a heat stabilizer.

EXAMPLE 20

Figure 6:
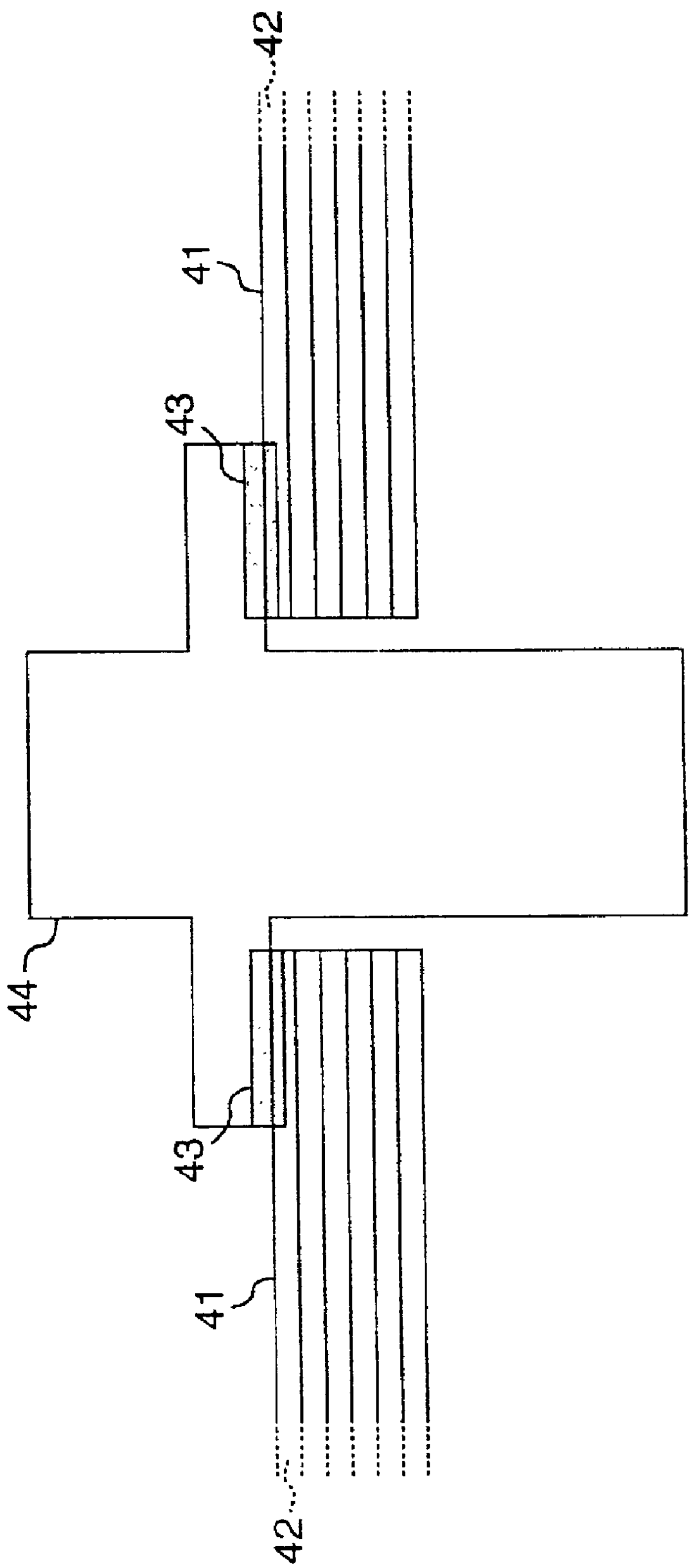
FIG. 6 is a conceptual cross-sectional view of a fuel inlet tube integrated with an automobile fuel tank on the basis of the present integrated structures.

FIG. 6 shows a product example of fuel inlet tube 44 integrated with automobile fuel tank 41 at weld part 43 by hot plate welding through direct contact with a hot plate, where automobile fuel tank 41 was molded into a 6-layered structure of 4 kinds of materials with outermost layer 42 molded from resin composition (a) comprising 100 parts by weight of a resin composition comprising 20 wt. % of polyacetal copolymer (a8-1) used as component (a-1) in Example 8 and 80 wt. % of polyethylene having an MFR of 7.0 determined according to ASTM-D1238 at 190° C. under a load of 21.60 kg as component (a-2), and 0.04 parts by weight of calcium monopalmitate-monostearate as a heat stabilizer. Fuel inlet tube 44 was molded from polyacetal copolymer composition used in Comparative Example 1.

EXAMPLE 21

FIG. 5 also shows a product example of intermediate layer 39 and vent line tube 37 integrated with float valve 36 provided in vent line at weld part 38 and weld part 40, respectively, by hot plate welding through direct contact with a hot plate, where float valve 36 provided in vent line was molded from polyacetal copolymer composition used in Comparative Example 1, intermediate layer 39 was molded from resin composition (a) comprising 100 parts by weight of polyacetal copolymer (a8-1) used in Example 8, 50 parts by weight of PO-4 as component (a-2) [33.3 wt. % as component (a-2)], and 0.04 parts by weight of calcium monopalmitate-monostearate as a heat stabilizer, and vent line tube was molded from nylon 6-6.

EXAMPLE 22

Figure 7:
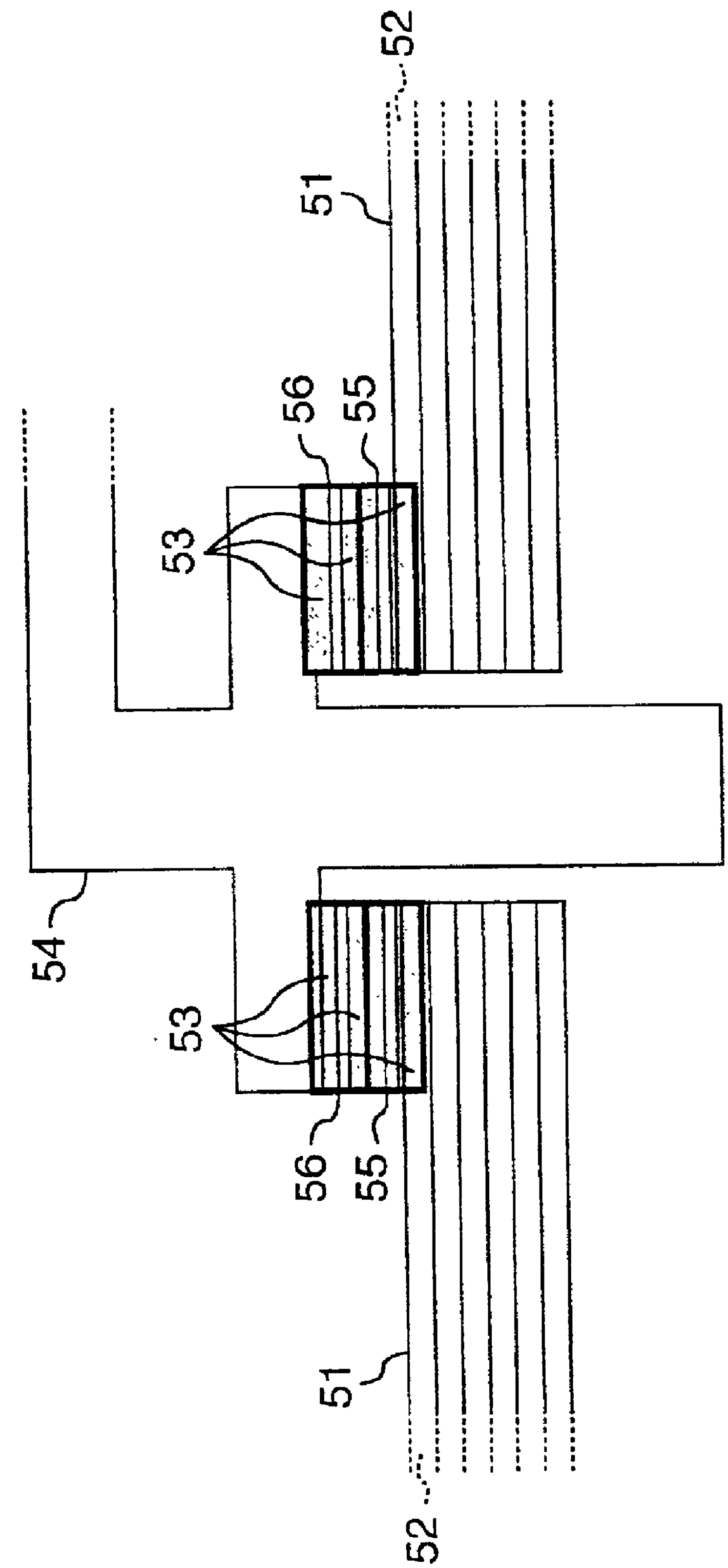
FIG. 7 is a conceptual cross-sectional view of a tube arranged in a recirculation line integrated with an automobile fuel tank on the basis of the present integrated structures.

FIG. 7 shows a product example of tube 54 provided in recirculation line integrated with automobile fuel tank 51 at weld parts 53 through a joined resin member of intermediate layer 55, which was integrated with intermediate layer 56 by a press molding, by hot plate welding through direct contact with a hot plate, where intermediate layer 55 was molded from resin composition (a) comprising 100 parts by weight of polyacetal copolymer (a8-1) used in Example 8, 50 parts by weight of PO-5 and 72.2 parts by weight of PO-1 as component (a-2) [55.0 wt. % as component (a-2)], and 0.5 parts by weight of nylon 6-6, adjusted to an average particle size of 4 μm as a heat stabilizer, intermediate layer 56 was molded from resin composition (a) comprising 100 parts by weight of polyacetal copolymer (a8-1) used in Example 8, 50 parts by weight of PO-5 and 135.7 parts by weight of PO-1 as component (a-2) [65.0 wt. % as component (a-2)], and 0.5 parts by weight of nylon 6-6 adjusted to an average particle size of 4 μm as a heat stabilizer, tube 54 was molded from polyacetal resin (Tenac CHC450, trademark of a product made by Asahi Chemical Industry Co., Ltd.) and automobile fuel tank 51 was blow molded into a 6-layered structure of 4 kinds of materials with polyethylene outermost layer 52 having an MFR of 7.0 determined according to ASTM-D1238 at 190° C. under a load of 21.60 kg.

What is claimed is:

1. A thermoplastic resin integrated structure, which comprises:

a structural member (A) molded from a resin composition (a) comprising 5–80% by weight of polyacetal resin (a-1) and 20–95% by weight of at least one resin (a-2) selected from the group consisting of polyolefin resin, olefinic elastomer and hydrogenated butadienic elastomer, wherein structural member (A) is a laminate composed of at least two layers each molded from the resin compositions (a), which are different from each other in composition;

a structural member (B) molded from thermoplastic resin (b); and a structural member (C) consisting essentially of polyacetal resin (c), and includes at least one structure of structural member (C)-structural member (A)-structural member (B) as integrated in this order, wherein the structural member (A) and the structural member (B) are integrated together by welding.

2. A thermoplastic resin integrated structure according to claim 1, wherein content of polyacetal resin (a-1) in the layer in contact with the structural member (C) is larger than that of polyacetal resin (a-1) in the layer in contact with the structural member (B).

3. A thermoplastic resin integrated structure according to claim 1, wherein the polyacetal resin (a-1) is a polyacetal copolymer having hydroxyalkyl groups at the molecule terminals and a hydroxyalkyl group terminal concentration of not less than $5\times10^{-5}$ mole per mole of oxymethylene units.

4. A thermoplastic resin integrated structure according to claim 1, wherein the polyacetal resin (a-1) comprises a polyacetal copolymer obtained by using water or an aliphatic alcohol having not more than 10 carbon atoms as a chain transfer agent, or together with formal, if required.

5. A thermoplastic resin integrated structure according to claim 1, the polyacetal resin (a-1) comprises a polyacetal block copolymer obtained by copolymerizing cyclic acetal with cyclic ether and/or cyclic formal, using a polymer having at least one hydroxyl group and a molecular weight of 500–10,000 as a chain transfer agent.

6. A thermoplastic resin integrated structure according to any one of claims 1 and 2–5, wherein polyacetal resin (a-1) comprises a polyacetal block copolymer having a number average molecular weight of 10,000–500,000, which comprises polyacetal segments (X) and a hydrogenated polybutadiene segment (Y) having a number average molecular weight of 500–10,000, hydroxy-alkylated at both ends, represented by the following formula (1):

(1)

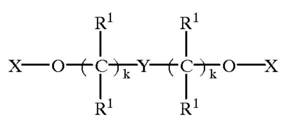

(where X comprises 95–99.9 mol. % of oxymethylene units and 0.1–5 mol. % of oxyalkylene units represented by the following formula (2):

(2)

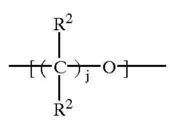

(where $R^2$ is independently selected from the group consisting of hydrogen, an alkyl group, a substituted group, alkyl group, an aryl group and a substituted aryl group and j is an integer selected from 2 to 6), and the terminal groups are polyacetal copolymer residues having a structure represented by the following formula (3):

(3)

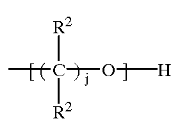

(where $R^2$ and j have the same meanings as defined above), Y is a hydrogenated polybutadiene containing 70–98% of 1,2 bonds and 2–30 mol. % of 1.4 bonds and having an iodine value of not more than 20 g-$I_2$/100 g, $R^1$ is independently selected from the group consisting of hydrogen, an alkyl group, a substituted alkyl group, an aryl group and a substituted aryl group and k is an integer selected from 2 to 6, where two ks may be the same or different from each other).

7. A thermoplastic resin integrated structure according to claim 6, wherein the resin (a-2) is a resin composition comprising;

at least one resin selected from the group consisting of polyethylene homopolymer, polyethylene copolymer, block copolymer containing ethylene as the main component and ionomer; and at least one resin selected from the group consisting of modified α-olefinic polymers.

8. A thermoplastic resin integrated structure according to claim 6, wherein the thermoplastic resin (b) is a resin selected from the group consisting of polyethylene homopolymer, polyethylene copolymer, block copolymer containing ethylene as the main component, ionomer and mixtures of at least two thereof.

9. A thermoplastic resin integrated structure according to claim 6, wherein the structural member (A) and the structural member (B) are integrated together by welding.

10. Automobile parts made from the thermoplastic resin integrated structure according to claim 6.

11. Automobile fuel-tank-related parts made from the thermoplastic resin integrated structure according to claim 6.

12. A thermoplastic resin integrated structure according to claim 1, wherein the resin (a-2) is at least one resin selected from the group consisting of polyethylene homopolymer, polyethylene copolymer, block copolymer containing ethylene as the main component and ionomer.

13. A thermoplastic resin integrated structure according to claim 1, wherein the resin (a-2) is a modified α-olefinic polymer.

14. A thermoplastic resin integrated structure according to claim 1, wherein the resin (a-2) is a resin composition comprising;

at least one resin selected from the group consisting of polyethylene homopolymer, polyethylene copolymer, block copolymer containing ethylene as the main component and ionomer; and at least one resin selected from the group consisting of modified α-olefinic polymers.

15. A thermoplastic resin integrated structure according to claim 1, wherein the thermoplastic resin (b) is a polyolefin resin.

16. A thermoplastic resin integrated structure according to claim 1, wherein the thermoplastic resin (b) is a resin selected from the group consisting of polyethylene homopolymer, polyethylene copolymer, block copolymer containing ethylene as the main component, ionomer and mixtures of at least two thereof.

17. A thermoplastic resin integrated structure according to claim 1, wherein the thermoplastic resin (b) is a modified α-olefinic polymer.

18. A thermoplastic resin integrated structure according to claim 1, wherein the thermoplastic resin (b) is a polyamide resin.

19. A thermoplastic resin integrated structure according to claim 1, wherein the structural member (A) and the structural member (B) are integrated together by a molding process selected from the group consisting of injection molding of different materials, resin insert injection molding, coextrusion molding of different materials and multilayer blow molding.

20. A thermoplastic resin integrated structure according to claim 1, wherein structural members (C)-(A)-(C) are integrated together in this order by welding or a molding process selected from the group consisting of injection molding of different materials, resin insert injection molding, coextrusion molding of different materials and multilayer blow molding.

21. A thermoplastic resin integrated structure, which comprises:

a structural member (A) molded from a resin composition (a) comprising 5–80% by weight of polyacetal resin (a-1) and 20–95% by weight of at least one resin (a-2) selected from the group consisting of polyolefin resin, olefinic elastomer and hydrogenated butadienic elastomer;

a structural member (B) molded from a polyacetal resin; and a structural member (C) consisting essentially of polyacetal resin (c), and includes at least one structure of structural member (C)-structural member (A)-structural member (B) as integrated in this order, wherein the structural member (A) and the structural member (B) are integrated together by welding.

* * * * *